US012485650B2

(12) United States Patent
Cheng et al.

(10) Patent No.: US 12,485,650 B2
(45) Date of Patent: *Dec. 2, 2025

(54) METAL COMPOSITE FILM AND ELECTROCHEMICAL APPARATUS

(71) Applicant: JIANGXI RUIERGY NEW MATERIAL TECHNOLOGY CO., LTD, Jiangxi (CN)

(72) Inventors: Yue Cheng, Jiangxi (CN); Bin Chen, Jiangxi (CN); Xiaoming Wang, Jiangxi (CN); Songhua Zhong, Jiangxi (CN); Hui Wang, Jiangxi (CN); Shaobo Yu, Jiangxi (CN); Zhi Zhuang, Jiangxi (CN)

(73) Assignee: JIANGXI RUIERGY NEW MATERIAL TECHNOLOGY CO., LTD, Jiangxi (CN)

( * ) Notice: Subject to any disclaimer, the term of this patent is extended or adjusted under 35 U.S.C. 154(b) by 274 days.

This patent is subject to a terminal disclaimer.

(21) Appl. No.: 18/265,626

(22) PCT Filed: Nov. 25, 2021

(86) PCT No.: PCT/CN2021/133241

§ 371 (c)(1),
(2) Date: Jun. 6, 2023

(87) PCT Pub. No.: WO2022/121700

PCT Pub. Date: Jun. 16, 2022

(65) Prior Publication Data

US 2024/0025151 A1 Jan. 25, 2024

(30) Foreign Application Priority Data

Dec. 7, 2020 (CN) ......................... 202011430235.6
Dec. 7, 2020 (CN) ......................... 202110426578.3

(51) Int. Cl.

| | |
|---|---|
| ***B32B 7/12*** | (2006.01) |
| ***B32B 15/082*** | (2006.01) |
| ***B32B 33/00*** | (2006.01) |
| ***B32B 37/12*** | (2006.01) |

(52) U.S. Cl.

CPC .............. *B32B 15/082* (2013.01); *B32B 7/12* (2013.01); *B32B 33/00* (2013.01); *B32B 37/1207* (2013.01); *B32B 2037/1215* (2013.01); *B32B 2250/03* (2013.01); *B32B 2255/06* (2013.01); *B32B 2255/10* (2013.01); *B32B 2307/4023* (2013.01); *B32B 2307/4026* (2013.01); *B32B 2307/7376* (2023.05); *B32B 2307/752* (2013.01); *B32B 2311/18* (2013.01); *B32B 2329/04* (2013.01); *B32B 2333/08* (2013.01); *B32B 2457/00* (2013.01); *B32B 2457/10* (2013.01)

(58) Field of Classification Search

None

See application file for complete search history.

(56) References Cited

FOREIGN PATENT DOCUMENTS

| | | | |
|---|---|---|---|
| CN | 106876614 | A | 6/2017 |
| CN | 107338429 | A | 11/2017 |
| CN | 109671876 | A | 4/2019 |
| CN | 111033787 | A | 4/2020 |
| CN | 112563632 | A | 3/2021 |
| CN | 113059884 | A | 7/2021 |
| CN | 113517504 | A | 10/2021 |
| EP | 2431171 | A1 | 3/2012 |
| EP | 3605642 | A1 | 2/2020 |
| EP | 4174999 | A1 | 5/2023 |
| JP | 2011052298 | A | 3/2011 |
| JP | 2011076956 | A | 4/2011 |
| JP | 2013235763 | A | 11/2013 |
| JP | 2014199761 | A | 10/2014 |
| JP | 2017030205 | A | 2/2017 |
| JP | 2017091952 | A | 5/2017 |
| JP | 2017224618 | A | 12/2017 |
| JP | 2019043647 | A | 3/2019 |
| JP | 6525121 | B1 | 6/2019 |
| KR | 20170057132 | A | 5/2017 |
| WO | 2013114934 | A1 | 8/2013 |
| WO | 2020153460 | A1 | 7/2020 |

OTHER PUBLICATIONS

Japan Patent Office, "Office Action", May 28, 2024, Japan.
European Patent Office, "Office Action", Feb. 14, 2025, Germany.
International Search Report of PCT/CN2021/133241, dated Feb. 11, 2022.
Written Opinion of PCT/CN2021/133241, dated Feb. 17, 2022.

*Primary Examiner* — Sheeba Ahmed

(74) *Attorney, Agent, or Firm* — Troutman Pepper Locke LLP; Tim Tingkang Xia, Esq.

(57) ABSTRACT

The present disclosure relates to the technical field of aluminum-plastic film production and discloses a metal composite film comprising an outer substrate resin layer, an intermediate metal layer and a heat-fusible resin layer; an anti-corrosion layer is formed on a side of the intermediate metal layer, the side being in contact with the heat-fusible resin layer; the anti-corrosion layer is formed of an anti-corrosion solution by coating or heat treatment; the components of the anti-corrosion solution include a trivalent chromium compound, an inorganic acid and an organic resin; the components of the anti-corrosion solution may further include a titanate; the components of the anti-corrosion solution may further include a fluoride. The use of the formula for the anti-corrosion solution within the range defined above in the present disclosure can significantly improve the initial peel strength of the intermediate metal layer and the heat-fusible resin layer of the metal composite film.

35 Claims, 1 Drawing Sheet

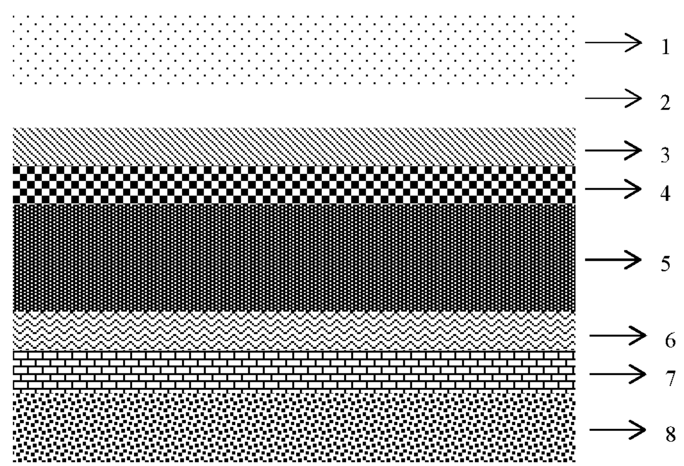
1
2
3
4
5
6
7
8

METAL COMPOSITE FILM AND ELECTROCHEMICAL APPARATUS

CROSS-REFERENCE TO RELATED APPLICATIONS

This application is a national stage application of PCT/CN2021/133241. This application claims priority from PCT Application No. PCT/CN2021/133241, filed Nov. 25, 2021. The present application claims priority to Chinese Patent Application No. CN 202011430235.6 filed with China National Intellectual Property Administration on Dec. 7, 2020 and titled "METAL COMPOSITE FILM AND ELECTROCHEMICAL APPARATUS", and Chinese Patent Application No. CN 202110426578.3 filed with China National Intellectual Property Administration on Dec. 7, 2020 and titled "METAL COMPOSITE FILM AND ELECTROCHEMICAL APPARATUS THEREOF", which are incorporated herein by reference in their entirety.

TECHNICAL FIELD

The present disclosure relates to the technical field of aluminum-plastic film production, and particularly to a metal composite film and an electrochemical apparatus using same.

BACKGROUND

At present, lithium-ion batteries are mainly divided into three categories: square lithium-ion batteries, cylinder lithium-ion batteries and soft pack lithium-ion batteries. The housings of the square and cylinder lithium-ion batteries are mainly made of hard materials such as aluminum alloys and stainless steel, and the aluminum alloy housing can be made of aluminum. The housings of the soft pack lithium-ion batteries formed by laminating metals and resins are made of metal composite films, which greatly improve the inflexibility in shape design of hard pack batteries.

However, as the outer packaging material for batteries, the metal composite film is required to have resistance to electrolyte solution corrosion, so as to prevent leakage from the housings of the batteries and other problems and ensure the service life of the batteries.

In general, the metals in metal composite films for the outer packaging of lithium-ion batteries require anti-corrosion treatment. In the case of a poor anti-corrosion treatment effect, if water is brought in to the process of battery manufacture, it will react with the lithium salt in the electrolyte solution, producing corrosive hydrogen fluoride (HF); hydrogen fluoride will pass through the inner heat-fusible resin layer and the inner-layer adhesive layer and reach the surface of the intermediate metal layer, thereby corroding the metal and causing the metal and the inner heat-fusible resin layer to separate. This increases the possibility that the electrolyte solution leaks from the batteries. Therefore, the anti-corrosion treatment of the metal has a great effect on the metal composite film.

At present, after the metal is treated with some anti-corrosion solutions for anti-corrosion purposes, the extent of the corrosion resistance of the metal composite film can be increased in some common electrolyte solution environments. However, in the long-term use of batteries, moisture may penetrate through the outer packaging of the batteries and cause production of hydrogen fluoride (HF) in the electrolyte solution, such that the anti-corrosion effect of the anti-corrosion solution treatment becomes poor, the layers of the metal composite films for lithium-ion batteries easily separate, and the popularization and use of the metal composite films in the field of lithium-ion batteries are affected.

SUMMARY

The present disclosure provides a metal composite film comprising an outer substrate resin layer, an intermediate metal layer and a heat-fusible resin layer; an anti-corrosion layer is formed on a side of the intermediate metal layer, the side being in contact with the heat-fusible resin layer; the anti-corrosion layer is formed of an anti-corrosion solution by coating or heat treatment, the anti-corrosion solution comprising 2.5-3.8 wt % trivalent chromium compound, 0.1-0.8 wt % inorganic acid and 1-1.2 wt % organic resin; the trivalent chromium compound is selected from chromium fluoride.

In some embodiments, the anti-corrosion solution further comprises a titanate; the anti-corrosion solution comprises 2.5-3.8 wt % trivalent chromium compound, 0.1-0.8 wt % inorganic acid, 1-1.2 wt % organic resin and 0-5 wt % titanate.

The present disclosure provides a metal composite film comprising an outer substrate resin layer, an intermediate metal layer and a heat-fusible resin layer; an anti-corrosion layer is formed on a side of the intermediate metal layer, the side being in contact with the heat-fusible resin layer; the anti-corrosion layer is formed of an anti-corrosion solution by coating or heat treatment, the anti-corrosion solution comprising 1.9-6 wt % trivalent chromium compound, 0.3-6 wt % inorganic acid and 0.6-6 wt % organic resin; the trivalent chromium compound consists of at least one of chromium nitrate, chromium phosphate and chromium chloride.

In some embodiments, the anti-corrosion solution further comprises a fluoride; the anti-corrosion solution comprises 1.9-6 wt % trivalent chromium compound, 0.3-6 wt % inorganic acid, 0-10 wt % fluoride and 0.6-6 wt % organic resin.

In some embodiments, the metal composite film further comprises an inner-layer adhesive layer disposed between the anti-corrosion layer and the heat-fusible resin layer.

In some embodiments, the metal composite film further comprises an outer-layer adhesive layer disposed between the outer substrate resin layer and the intermediate metal layer.

In some embodiments, the metal composite film further comprises a colored layer disposed between the outer substrate resin layer and the outer-layer adhesive layer or formed by adding a pigment to the outer-layer adhesive layer.

In some embodiments, the metal composite film further comprises a colored layer disposed on the outer side of the outer substrate resin layer.

In some embodiments, an outer anti-corrosion layer is disposed on a side of the intermediate metal layer, the side being in contact with the outer-layer adhesive layer or the outer substrate resin layer.

In some embodiments, the inorganic acid consists of one or more of nitric acid and hydrofluoric acid.

In some embodiments, the inorganic acid consists of one or more of nitric acid and phosphoric acid.

In some embodiments, the organic resin is polyvinyl alcohol.

In some embodiments, the organic resin consists of a polyacrylic acid-based resin, or a polyacrylic acid-based resin and polyvinyl alcohol.

In some embodiments, the polyacrylic acid-based resin is one or more of polyacrylic acid, polymethyl acrylate, a copolymer of acrylic acid and maleic acid, a copolymer of acrylic acid and styrene, and a sodium or ammonium salt derivative thereof; the polyacrylic acid-based resin has a weight-average molecular weight of 10,000-800,000.

In some embodiments, the anti-corrosion layer has a thickness of 1 nm to 3.0 μm.

In some embodiments, the anti-corrosion layer has a thickness of 1 nm to 1.5 μm.

In some embodiments, the anti-corrosion layer has a chromium content of 8-50 $mg/m^2$.

In some embodiments, the anti-corrosion layer has a chromium content of 10-30 $mg/m^2$.

In some embodiments, the anti-corrosion layer is formed of an anti-corrosion solution by coating or heat treatment.

In some embodiments, the coating includes bar coating, roll coating, gravure coating and impregnation.

In some embodiments, the titanate is selected from one or more of titanous sulfate, titanium oxysulfate, titanium ammonium sulfate, titanium nitrate, titanium ammonium nitrate, titanium sulfate, fluorotitanic acid and a complex thereof.

In some embodiments, the fluoride is selected from one or more of chromium fluoride and aluminum fluoride.

In some embodiments, the inner-layer adhesive layer is formed of a solution-type adhesive, whose components include an acid-modified polyolefin resin and a curing agent; the inner-layer adhesive layer has a thickness of 1-10 μm.

In some embodiments, the acid-modified polyolefin resin has a melting point of 60-155° C., a weight-average molecular weight of 10,000-150,000, and an acid value of 0.5-200 mg KOH/g.

In some embodiments, the curing agent is selected from one or more of an isocyanate, an epoxy resin and an oxazoline, or one or more of triethylamine and N,N-dimethylethanolamine; an acid modifier used for the acid-modified polyolefin resin is one of maleic anhydride, methacrylic acid, acrylic acid and itaconic anhydride.

In some embodiments, when the curing agent is selected from one or more of triethylamine and N,N-dimethylethanolamine, the acid-modified polyolefin resin and the curing agent are in a mass ratio of 10:1 to 125:1.

In some embodiments, the acid-modified polyolefin resin and the curing agent are in a mass ratio of 15:1 to 50:1.

In some embodiments, the acid-modified polyolefin resin is a single layer or multiple layers consisting of one of or a blend of more of a block copolymer polypropylene resin, a random copolymer polypropylene resin and a homopolymer polypropylene resin having a melting point of above 110° C. and a polypropylene content of greater than 50%.

In some embodiments, the inner-layer adhesive layer is formed of a hot-melt inner-layer adhesive, whose components include an acid-modified polyolefin resin; the inner-layer adhesive layer has a thickness of 2-80 μm.

In some embodiments, the acid-modified polyolefin resin has a melting point of 135-165° C. and an MFR (230° C.) of 3-15 g/10 min.

In some embodiments, an acid modifier used for the acid-modified polyolefin resin is one of maleic anhydride, methacrylic acid, acrylic acid and itaconic anhydride, and the polyolefin resin has a degree of modification of 1% to 15%.

In some embodiments, the heat-fusible resin layer is a single layer or a composite layer consisting of one of or a mixture of two or more of an acid-modified polyolefin resin, a homopolymer polypropylene resin, a block copolymer polypropylene resin, a random copolymer polypropylene resin, and a polyethylene resin.

In some embodiments, a constituent resin of the heat-fusible resin layer has a melting point of 120-162° C. and an MFR (230° C.) of 2-15 g/10 min; the heat-fusible resin layer has a thickness of 20-120 μm.

The present disclosure provides an electrochemical apparatus using the metal composite film described in any one of the above.

BRIEF DESCRIPTION OF THE DRAWING

FIG. 1 is a schematic diagram of the structure of the metal composite film according to an embodiment of the present disclosure;

wherein 1 is an outer substrate resin layer; 2 is an outer-layer adhesive layer; 3 is a colored layer; 4 is an outer corrosion-resistant layer; 5 is an intermediate metal layer; 6 is a corrosion-resistant layer; 7 is an inner-layer adhesive layer; 8 is a heat-fusible resin layer.

DETAILED DESCRIPTION

The embodiments of the present disclosure are illustrated below in detail using the drawing. It will be appreciated that the embodiments described herein are intended to illustrate and explain the present disclosure only rather than limit the present disclosure.

The present disclosure provides a metal composite film (i.e., the first embodiment) comprising an outer substrate resin layer, an intermediate metal layer and a heat-fusible resin layer; an anti-corrosion layer is formed on a side of the intermediate metal layer, the side being in contact with the heat-fusible resin layer; the components of the anti-corrosion layer include a trivalent chromium compound, an inorganic acid and an organic resin; the trivalent chromium compound, the inorganic acid and the organic resin are in a mass ratio of (25-38):(1-8):(10-12); the trivalent chromium compound is selected from chromium fluoride.

In some embodiments, the anti-corrosion layer is formed of an anti-corrosion solution by coating or heat treatment, and the trivalent chromium compound, the inorganic acid and the organic resin in the anti-corrosion solution are in a mass ratio of (25-38):(1-8):(10-12).

In some embodiments, the trivalent chromium compound, the inorganic acid and the organic resin may be in a mass ratio of, for example, (25-30):(5-8):(10-12), (30-35):(5-8):(10-12) or (25-35):(2-8):(10-12).

In some embodiments, the components of the anti-corrosion layer further include a titanate; the trivalent chromium compound, the inorganic acid, the organic resin and the titanate are in a mass ratio of (25-38):(1-8):(10-12):(1-5).

In some embodiments, the anti-corrosion solution further comprises a titanate; the trivalent chromium compound, the inorganic acid, the organic resin and the titanate are in a mass ratio of (25-38):(1-8):(10-12):(0-5).

In some embodiments, the trivalent chromium compound, the inorganic acid, the organic resin and the titanate may be in a mass ratio of, for example, (30-38):(2-8):(10-12):(1-4), (25-35):(5-8):(10-12):(1-5) or (30-38):(1-8):(10-12):(1-5).

In some embodiments, provided is a metal composite film comprising an outer substrate resin layer, an intermediate metal layer and a heat-fusible resin layer; an anti-corrosion layer is formed on a side of the intermediate metal layer, the side being in contact with the heat-fusible resin layer; the anti-corrosion layer is formed of an anti-corrosion solution by coating or heat treatment, the anti-corrosion solution comprising 2.5-3.8 wt % trivalent chromium compound, 0.1-wt % inorganic acid and 1-1.2 wt % organic resin.

In some embodiments, the anti-corrosion solution further comprises a titanate; the anti-corrosion solution comprises 2.5-3.8 wt % trivalent chromium compound, 0.1-0.8 wt % inorganic acid, 1-1.2 wt % organic resin and 0-5 wt % titanate.

In some embodiments, the metal composite film comprises an outer substrate resin layer, an intermediate metal layer and a heat-fusible resin layer; an anti-corrosion layer is formed on a side of the intermediate metal layer, the side being in contact with the heat-fusible resin layer; the anti-corrosion layer is formed of an anti-corrosion solution by coating or heat treatment, the anti-corrosion solution comprising 1.9-6 wt % trivalent chromium compound, 0.3-6 wt % inorganic acid and 0.6-6 wt % organic resin; the trivalent chromium compound consists of at least one of chromium nitrate, chromium phosphate and chromium chloride.

In some embodiments, the anti-corrosion solution further comprises a fluoride; the anti-corrosion solution comprises 1.9-6 wt % trivalent chromium compound, 0.3-6 wt % inorganic acid, 0-10 wt % fluoride and 0.6-6 wt % organic resin.

The above metal composite film with or without the titanate component in the anti-corrosion layer may further comprise an inner-layer adhesive layer disposed between the anti-corrosion layer and the heat-fusible resin layer.

In some other embodiments, an outer-layer adhesive layer disposed between the outer substrate resin layer and the intermediate metal layer is comprised.

The above metal composite film with or without the titanate component in the anti-corrosion layer may further comprise an outer-layer adhesive layer disposed between the outer substrate resin layer and the intermediate metal layer.

The above metal composite films of various structures may further comprise a colored layer disposed between the outer substrate resin layer and the outer-layer adhesive layer or formed by adding a pigment to the outer-layer adhesive layer.

Further, the colored layer may also be disposed on the outer side of the outer substrate resin layer.

The metal composite film may also be matted; that is, the surface of the outer substrate resin layer is coated with a layer of matting agent.

Any one of the above metal composite films may comprise an outer anti-corrosion layer disposed on a side of the intermediate metal layer, the side being in contact with the outer-layer adhesive layer or the outer substrate resin layer.

Without wishing to be bound by theory, it is believed that the trivalent chromium compound may form on the metal surface a coordinated crosslinked structure centered on a Cr atom to increase the degree of crosslinking of the anti-corrosion film on the metal surface.

The inorganic acid in any one of the metal composite films described above may consist of one or more of nitric acid and hydrofluoric acid. Without wishing to be bound by theory, it is believed that the inorganic acid serves to remove oxide films from the metal surface.

The organic resin in any one of the metal composite films described above may be polyvinyl alcohol. The polyvinyl alcohol serves to form a resin film, which can enhance the adhesion to the inner-layer adhesive.

The proportion ranges for the components of the anti-corrosion layer of the present disclosure are obtained by the inventors through a great deal of effort and involve an inventive step. The proportion ranges play a decisive role in solving the technical problems of the present disclosure and achieving the technical effects. The effects are described below.

When the proportion of the trivalent chromium compound is within the above range, the folding resistance and toughness of the metal composite film are improved, preventing the anti-corrosion layer from cracking in a bending or forming process, preventing the electrolyte solution from entering and thereby improving insulativity, and also preventing the hydrogen fluoride corrosion-caused separation of the intermediate metal layer and the inner heat-fusible resin layer leading to electrolyte solution leakage; the anti-corrosion layer has a good degree of crosslinking and thus has a good anti-corrosion effect and plays a good role in preventing corrosion. When the proportion of the trivalent chromium compound is beyond the above range, the anti-corrosion film on the metal surface becomes hard, and accordingly, the folding resistance of the metal composite film becomes poor, in which case the anti-corrosion layer will crack in a bending or forming process, the electrolyte solution will enter causing a decrease in insulativity, and hydrogen fluoride corrosion causes the intermediate metal layer and the inner heat-fusible resin layer to peel apart, leading to electrolyte solution leakage; when the proportion of the trivalent chromium compound is below the above range, the anti-corrosion film on the metal surface will have a relatively small degree of crosslinking and thus fail to prevent corrosion.

When the proportion of the inorganic acid is within the above range, an anti-corrosion layer with high corrosion resistance is obtained, and therefore, the resistance to hydrogen fluoride corrosion is improved; moreover, the oxide film on the metal surface can be completely removed, so that the adhesion between the anti-corrosion layer and the intermediate metal layer is good, and therefore, the intermediate metal layer and the inner heat-fusible resin layer are effectively prevented from peeling apart in a device in long-term storage. When the proportion of the inorganic acid is beyond the above range, the proportions of the trivalent chromium compound content and the organic resin content in the anti-corrosion layer are reduced, and accordingly, an anti-corrosion layer with high corrosion resistance cannot be obtained, such that the resistance to hydrogen fluoride corrosion becomes poor; when the proportion of the organic acid is below the above range, the oxide film on the metal surface is not removed completely, and the adhesion between the anti-corrosion layer and the intermediate metal layer becomes poor, such that the intermediate metal layer and the inner heat-fusible resin layer may peel apart in a device in long-term storage.

When the proportion of the organic resin is within the above range, an anti-corrosion layer with proper thickness is formed, and the adhesion of the anti-corrosion layer to the inner-layer adhesive layer is good, so that the risk that the intermediate metal layer and the inner heat-fusible resin layer may peel apart is eliminated. When the proportion of the organic resin is beyond the above range, the formed anti-corrosion layer is too thick and too hard, such that in the deep drawing process of forming the metal composite film, there is a risk that the intermediate metal layer and the inner heat-fusible resin layer may peel apart; when the proportion of the organic resin is below the above range, the adhesion to the inner-layer adhesive layer is inadequate, such that there is a risk that the intermediate metal layer and the inner heat-fusible resin layer may peel apart.

When the proportion of the titanate is within the above range, the folding resistance of the metal composite film is improved, preventing the anti-corrosion layer from cracking during processing and finally the electrolyte solution from leaking. When the proportion of the titanate is beyond the above range, the anti-corrosion film on the metal surface becomes hard, and accordingly, the folding resistance of the metal composite film becomes poor, in which case the anti-corrosion layer will crack in a bending or forming process, the electrolyte solution will enter causing a decrease in insulativity, and hydrogen fluoride corrosion causes the intermediate metal layer and the inner heat-fusible resin layer to peel apart, leading to electrolyte solution leakage.

The anti-corrosion layer in any one of the metal composite films described above has a thickness of 1 nm to 3.0 μm. For example, the anti-corrosion layer has a thickness of 1 nm to 1.5 μm.

The anti-corrosion layer in any one of the metal composite films described above has a chromium content of 8-50 mg/m$^2$. For example, the anti-corrosion layer has a chromium content of 10-30 mg/m$^2$.

The anti-corrosion layer in any one of the metal composite films described above is formed of an anti-corrosion solution by coating or heat treatment. In some embodiments, the anti-corrosion solution further comprises the solvent water and an organic solvent. In some embodiments, the amount of the organic solvent is 10-30%. In some embodiments, the organic solution may be a glycol ether. In some embodiments, the anti-corrosion solution further comprises the solvent water and the organic solvent 2-butoxyethanol. In some embodiments, the amount of the organic solvent 2-butoxyethanol in the anti-corrosion solution is 10-30%. Without wishing to be bound by theory, it is believed that 2-butoxyethanol serves in the present disclosure to enhance the leveling of the anti-corrosion solution on the metal foil.

When the proportion of the organic solvent is beyond the given range, the organic solvent volatilizes, posing a risk of explosion during coating; when the proportion of the organic solvent is below the given range, the leveling of the anti-corrosion solution on the metal foil is not good, such that the corrosion resistance of the metal composite film is poor.

In some other embodiments, the coating includes bar coating, roll coating, gravure coating and impregnation.

When the anti-corrosion layer comprises the titanate component, the titanate is selected from one or more of titanous sulfate, titanium oxysulfate, titanium ammonium sulfate, titanium nitrate, titanium ammonium nitrate, titanium sulfate, fluorotitanic acid and a complex thereof. Optionally, the titanate is fluorotitanic acid. Without wishing to be bound by theory, it is believed that the titanate serves to increase the degree of crosslinking of the anti-corrosion film on the metal surface.

The inner-layer adhesive layer of the metal composite film of the present disclosure may be formed of a solution-type adhesive, whose components include an acid-modified polyolefin resin and a curing agent; the inner-layer adhesive layer has a thickness of 1-10 μm, optionally 1-5 μm.

In some embodiments, the acid-modified polyolefin resin has a melting point of 60-155° C., a weight-average molecular weight of 10,000-150,000, and an acid value of 0.5-200 mg KOH/g.

In some other embodiments, a solution-type inner-layer adhesive with an organic solvent is used, and the acid-modified polypropylene has a weight-average molecular weight of 10,000-150,000, and a melting point of 60-130° C.

In some other embodiments, when a solution-type inner-layer adhesive with water or an alcohol as a solvent is used, the acid-modified polypropylene has a weight-average molecular weight of 5000-800,000, for example, 10,000-150,000, and a melting point of 100-155° C. In some embodiments, the acid-modified polypropylene has a weight-average molecular weight of 5000-700,000, 10,000-800,000, 20,000-700,000 or 20,000-500,000, such as 10,000, 50,000, 100,000, 150,000, 200,000, 250,000, 300, 000, 350,000, 400,000, 450,000, 500,000, 550,000, 600,000, 650,000, 700,000 or 750,000.

In some embodiments, the curing agent is selected from one or more of an isocyanate, an epoxy resin and an oxazoline, or one or more of triethylamine and N,N-dimethylethanolamine; an acid modifier used for the acid-modified polyolefin resin is one of maleic anhydride, methacrylic acid, acrylic acid and itaconic anhydride.

In some other embodiments, when the curing agent is selected from one or more of triethylamine and N,N-dimethylethanolamine, the acid-modified polyolefin resin and the curing agent are in a mass ratio of 10:1 to 125:1. For example, the acid-modified polyolefin resin and the curing agent are in a mass ratio of 15:1 to 50:1. For example, the acid-modified polyolefin resin and the curing agent are in a mass ratio of 15:1 to 40:1, 20:1 to 50:1, or 20:1 to 50:1.

In some other embodiments, the acid-modified polyolefin resin is a single layer or multiple layers consisting of one of or a blend of more of a block copolymer polypropylene resin (B-PP), a random copolymer polypropylene resin (R-PP) and a homopolymer polypropylene resin (H-PP) having a melting point of above 110° C. and a polypropylene content of greater than 50%.

The inner-layer adhesive layer of the metal composite film of the present disclosure may be formed of a hot-melt inner-layer adhesive, whose components include an acid-modified polyolefin resin; the inner-layer adhesive layer has a thickness of 2-80 μm, for example, 5-80 μm, 10-80 μm, 20-80 μm or 30-80 μm, for example, 5-50 μm.

In some embodiments, the acid-modified polyolefin resin has a melting point of 135-165° C. and an MFR (230° C.) of 3-15 g/10 min.

In some embodiments, an acid modifier used for the acid-modified polyolefin resin is one of maleic anhydride, methacrylic acid, acrylic acid and itaconic anhydride, and the polyolefin resin has a degree of modification of 1% to 15%, for example, 3% to 12%.

The heat-fusible resin layer in any one of the metal composite films described above is a single layer or a composite layer consisting of one of or a mixture of two or more of an acid-modified polyolefin resin, a homopolymer polypropylene resin, a block copolymer polypropylene resin, a random copolymer polypropylene resin, and a polyethylene resin.

In some embodiments, the constituent resin of the heat-fusible resin layer has a melting point of 120-162° C. and an MFR (230° C.) of 2-15 g/10 min, for example, a melting point of 130-162° C. and an MFR (230° C.) of 3-12 g/10 min; the heat-fusible resin layer has a thickness of 20-120 μm, for example, 20-110 μm, 20-100 μm, or 20-80 μm, such as 20 μm, 25 μm, 30 μm, 35 μm, μm, 45 μm, 50 μm, 55 μm, 60 μm, 65 μm, 70 μm, 75 μm, 80 μm, 90 μm, 100 μm or 120 μm, for example, 25-80 μm.

When the heat-fusible resin layer is a composite layer, the resin layer on the reverse side of the heat-fusible resin layer compounded with the intermediate metal layer has a thickness of 2 μm or greater and a melting point of 130-152° C.

One or more heat-fusible resin layers are formed by heat extrusion and compounded with the intermediate metal layer on which an inner-layer adhesive layer is formed in advance;

the inner-layer adhesive layer requires heat treatment at a temperature that is not more than 60° C. above its melting point.

One or more heat-fusible resin layers are formed by compounding with the intermediate metal layer by heat extrusion. In the inner heat-fusible resin layer, the inner resin layer in contact with the intermediate metal layer requires heat treatment at a temperature that is not more than 60° C. above its melting point.

The outer substrate resin layer in any one of the metal composite films described above may be a composite film of one or two or more layers formed of one or more of polymer materials such as blown film nylon, synchronously or asynchronously biaxially stretched nylon, synchronously or asynchronously biaxially stretched polyethylene terephthalate (PET), synchronously or asynchronously biaxially stretched polybutylene terephthalate (PBT), polyimide (PI) and thermosetting polyamide. The outer substrate resin layer may be a composite film of one or two or more layers formed by one or more of extrusion, coating, compounding and thermal bonding. The outer substrate resin layer has a total thickness of 5-35 μm, for example, 10-35 μm, 15-35 μm or 5-30 μm, such as 5 μm, 8 μm, 10 μm, 12 μm, 15 μm, 20 μm, 23 μm, 25 μm, 30 μm, 32 μm or 35 μm.

The outer-layer adhesive layer in any one of the metal composite films described above is a bi-component or multi-component layer comprising one or two of a polyester polyol and a polyurethane-modified polyester polyol and comprising an isocyanate, and the outer adhesive layer has a thickness of 2-5 μm, for example, 2 μm, 3 μm, 4 μm or 5 μm.

The intermediate metal layer in any one of the metal composite films described above consists of a single layer or multiple layers of one or two or more of aluminum foil, iron sheet, stainless steel foil and nickel-plated iron sheet, and the intermediate metal layer has a thickness of 20-100 μm, for example, 30-100 μm, 40-100 μm, 50-100 μm, 20-90 μm or 20-80 μm, such as 20 μm, 30 μm, 40 μm, 50 μm, 60 μm, 70 μm, 80 μm, 90 μm or 100 μm.

The present disclosure provides a metal composite film (the second embodiment) comprising an outer substrate resin layer, an intermediate metal layer and a heat-fusible resin layer; an anti-corrosion layer is formed on a side of the intermediate metal layer, the side being in contact with the heat-fusible resin layer; the components of the anti-corrosion layer include a trivalent chromium compound, an inorganic acid and an organic resin; the trivalent chromium compound, the inorganic acid and the organic resin are in a mass ratio of (19-60):(3-60):(6-60); the trivalent chromium compound consists of at least one of chromium nitrate, chromium phosphate and chromium chloride.

In some embodiments, the anti-corrosion layer is formed of an anti-corrosion solution by coating or heat treatment, and the trivalent chromium compound, the inorganic acid and the organic resin in the anti-corrosion solution are in a mass ratio of (19-60):(3-60):(6-60); the trivalent chromium compound consists of at least one of chromium nitrate, chromium phosphate and chromium chloride.

In some embodiments, the components of the anti-corrosion layer further include a titanate; the components of the anti-corrosion layer further include a fluoride; the trivalent chromium compound, the inorganic acid, the organic resin and the fluoride are in a ratio of (19-60):(3-60):(6-60):(1-10).

In some embodiments, the anti-corrosion solution further comprises a fluoride; the trivalent chromium compound, the inorganic acid, the organic resin and the fluoride are in a mass ratio of (19-60):(3-60):(6-60):(0-10), optionally (19-60):(3-60):(6-60):(1-10).

The above metal composite film with or without the fluoride component in the anti-corrosion layer may further comprise an inner-layer adhesive layer disposed between the anti-corrosion layer and the heat-fusible resin layer.

In some other embodiments, an outer-layer adhesive layer disposed between the outer substrate resin layer and the intermediate metal layer is comprised.

The above metal composite film with or without the fluoride component in the anti-corrosion layer may further comprise an outer-layer adhesive layer disposed between the outer substrate resin layer and the intermediate metal layer.

The above metal composite films of various structures may further comprise a colored layer disposed between the outer substrate resin layer and the outer-layer adhesive layer or formed by adding a pigment to the outer-layer adhesive layer.

Further, the colored layer may also be disposed on the outer side of the outer substrate resin layer.

The metal composite film may also be matted; that is, the surface of the outer substrate resin layer is coated with a layer of matting agent.

Any one of the above metal composite films may comprise an outer anti-corrosion layer disposed on a side of the intermediate metal layer, the side being in contact with the outer-layer adhesive layer or the outer substrate resin layer.

The trivalent chromium compound may form on the metal surface a coordinated crosslinked structure centered on a Cr atom to increase the degree of crosslinking of the anti-corrosion film on the metal surface.

The inorganic acid in any one of the metal composite films described above consists of one or more of nitric acid and phosphoric acid. The inorganic acid serves to remove oxide films from the metal surface.

The organic resin in any one of the metal composite films described above consists of a polyacrylic acid-based resin, or a polyacrylic acid-based resin and polyvinyl alcohol. The polyacrylic acid-based resin is one or more of polyacrylic acid, polymethyl acrylate, a copolymer of acrylic acid and maleic acid, a copolymer of acrylic acid and styrene, and a derivative such as a sodium or ammonium salt thereof, optionally a derivative of polyacrylic acid such as an ammonium, sodium or amine salt of polyacrylic acid. In addition, the polyacrylic acid-based resin is optionally a copolymer of acrylic acid and a dicarboxylic acid or a dicarboxylic anhydride, and further optionally an ammonium, sodium or amine salt of the copolymer of acrylic acid and the dicarboxylic acid or the dicarboxylic anhydride; the polyacrylic acid-based resin serves to improve the film formability of the anti-corrosion layer on the metal surface.

The polyacrylic acid-based resin has a weight-average molecular weight of, for example, about 1000 to 1 million, for example, about 3000 to 800 thousand, and in some embodiments, for example, about 10 thousand to 800 thousand.

The larger the weight-average molecular weight of the polyacrylic acid-based resin, the higher the durability thereof, but the solubility of the polyacrylic acid-based resin in water is lowered, so the coating solution becomes unstable, and the production stability is affected. Conversely, the smaller the weight-average molecular weight of the polyacrylic acid-based resin, the lower the durability thereof. When the polyacrylic acid-based resin has a weight-average molecular weight of 1000 or greater, the durability thereof is high; when the weight-average molecular weight is 1 million or less, the coating stability in production is good.

The proportion ranges for the components of the anti-corrosion layer of the present disclosure are obtained by the inventors through a great deal of experimental effort. The proportion ranges play a decisive role in solving the technical problems of the present disclosure and achieving the technical effects. The effects are described below.

When the proportion of the trivalent chromium compound is within the above range, the folding resistance and toughness of the metal composite film are improved, thereby preventing the anti-corrosion layer from cracking during processing and finally the electrolyte solution from leaking; the anti-corrosion layer has a good degree of crosslinking and thus has a good anti-corrosion effect. When the proportion of the trivalent chromium compound is beyond the above range, the anti-corrosion film on the metal surface becomes hard, and accordingly, the folding resistance of the metal composite film becomes poor, in which case the anti-corrosion layer will crack in a bending or forming process, the electrolyte solution will enter causing a decrease in insulativity, and hydrogen fluoride corrosion causes the intermediate metal layer and the inner heat-fusible resin layer to peel apart, leading to electrolyte solution leakage; when the proportion of the trivalent chromium compound is below the above range, the anti-corrosion film on the metal surface will have a relatively small degree of crosslinking and thus fail to prevent corrosion.

When the proportion of the inorganic acid is within the above range, an anti-corrosion layer with high corrosion resistance is obtained, and therefore, the resistance to hydrogen fluoride corrosion is improved; moreover, the oxide film on the metal surface can be completely removed, so that the adhesion between the anti-corrosion layer and the intermediate metal layer is good, and therefore, the intermediate metal layer and the inner heat-fusible resin layer are effectively prevented from peeling apart in a device in long-term storage. When the proportion of the inorganic acid is beyond the above range, the proportions of the trivalent chromium compound content and the organic resin content in the anti-corrosion layer are reduced, and accordingly, an anti-corrosion layer with high corrosion resistance cannot be obtained, such that the resistance to hydrogen fluoride corrosion becomes poor; when the proportion of the organic acid is below the above range, the oxide film on the metal surface is not removed completely, and the adhesion between the anti-corrosion layer and the intermediate metal layer becomes poor, such that the intermediate metal layer and the inner heat-fusible resin layer may peel apart in a device in long-term storage.

When the proportion of the organic resin is in the above range, an anti-corrosion layer with proper thickness is formed, and the anti-corrosion film on the metal surface does not easily delaminate or break, so that the effective corrosion resistance of the metal composite film is ensured; the film does not easily absorb water, so that HF will not be easily generated in an electrolyte solution environment, and its corrosion resistance is improved. When the proportion of the organic resin is below the above range, the anti-corrosion film on the metal surface delaminates and easily breaks, and accordingly, the corrosion resistance of the metal composite film becomes poor; when the proportion of the organic resin is beyond the above range, the anti-corrosion film on the metal surface is too thick and also easily breaks, and it easily absorbs water, such that HF is easily generated in an electrolyte solution environment, corroding the metal surface, and accordingly, the corrosion resistance of the metal composite film becomes poor.

When the proportion of the fluoride is within the above range, the bridging ability of trivalent chromium is improved, effectively promoting the formation of an anti-corrosion layer, so that the risk that the intermediate metal layer and the inner heat-fusible resin layer may peel apart is avoided, the waste of resources is avoided, the resistance to hydrofluoric acid (HF) corrosion is improved, and a good anti-corrosion effect for protecting the metal surface is obtained. When the proportion of the fluoride is beyond the above range, the bridging ability of trivalent chromium becomes poor, affecting the formation of an anti-corrosion layer, posing a risk that the intermediate metal layer and the inner heat-fusible resin layer may peel apart and also leading to the waste of resources; when the proportion of the fluoride is below the above range, the resistance to hydrofluoric acid (HF) corrosion is not good, such that an anti-corrosion effect for protecting the metal surface cannot be obtained.

The anti-corrosion layer in any one of the metal composite films described above has a thickness of 1 nm to 3.0 μm. For example, the anti-corrosion layer may have a thickness of 100 nm to 3.0 μm, 500 nm to 3.0 μm, 1.0 μm to 3.0 μm, or 1 nm to 2.0 μm, such as 1 nm, 50 nm, 100 nm, 200 nm, 400 nm, 800 nm, 1.0 μm, 1.5 μm, 2.0 μm, 2.5 μm or 3.0 μm. For example, the anti-corrosion layer has a thickness of 1 nm to 1.5 μm.

The anti-corrosion layer in any one of the metal composite films described above has a chromium content of 8-50 $mg/m^2$. For example, the chromium content is 8-45 $mg/m^2$, 8-40 $mg/m^2$ or 10-35 $mg/m^2$, such as 8 $mg/m^2$, 10 $mg/m^2$, 12 $mg/m^2$, 14 $mg/m^2$, 18 $mg/m^2$, 20 $mg/m^2$, 22 $mg/m^2$, 24 $mg/m^2$, 26 $mg/m^2$, 28 $mg/m^2$, 30 $mg/m^2$, 35 $mg/m^2$, 38 $mg/m^2$, 40 $mg/m^2$, 43 $mg/m^2$, 46 $mg/m^2$ or 50 $mg/m^2$. For example, the anti-corrosion layer has a chromium content of 10-30 $mg/m^2$.

The anti-corrosion layer in any one of the metal composite films described above is formed of an anti-corrosion solution by coating or heat treatment.

In some other embodiments, the coating includes bar coating, roll coating, gravure coating and impregnation.

When the anti-corrosion layer comprises a fluoride component, the fluoride is selected from one or more of chromium fluoride and aluminum fluoride. The fluoride serves to increase the resistance of the metal film to hydrofluoric acid (HF).

Other definitions regarding the inner-layer adhesive layer, the heat-fusible resin layer, the outer substrate resin layer, the outer-layer adhesive layer and the intermediate metal layer, as well as options, are the same as those in the first embodiment.

One embodiment of the present disclosure also provides an electrochemical apparatus using any one of the metal composite films described above.

The metal composite film and the electrochemical apparatus provided by the present disclosure overcome the disadvantages of the prior art, and are a corrosion-resistant metal composite film and an electrochemical apparatus that are stable in the long run, wherein:

1) after a large amount of experimental exploration, verification, adjustment and confirmation on the proportions of the trivalent chromium compound, the inorganic acid and the organic resin, which are major components of the anti-corrosion layer on the intermediate metal surface, the inventors achieved that when the contents of the trivalent chromium compound, the inorganic acid and the organic resin on the intermediate metal surface are within the ranges claimed by the present disclosure, the initial peel strength of the intermediate metal layer and the heat-fusible resin layer of the metal composite film and the corrosion resistance in a water-free or water-containing electrolyte solution environment can be significantly improved;

2) on the basis of 1), addition of a titanate component to the anti-corrosion layer on the intermediate metal surface within the specific proportion range obtained by the inventors after a large amount of experimental exploration, verification and confirmation can further improve the initial peel strength of the intermediate metal layer and the heat-fusible resin layer of the metal composite film and the corrosion resistance in a water-free or water-containing electrolyte solution environment;

3) after a large amount of experimental exploration, verification, adjustment and confirmation on the proportions of the trivalent chromium compound, the inorganic acid and the organic resin, which are major components of the anti-corrosion layer on the intermediate metal surface, the inventors achieved that when the contents of the trivalent chromium compound, the inorganic acid and the organic resin on the intermediate metal surface are within the ranges claimed by the present disclosure, the initial peel strength of the intermediate metal layer and the heat-fusible resin layer of the metal composite film and the corrosion resistance in a water-free or water-containing electrolyte solution environment can be significantly improved;

4) on the basis of 1)-3), addition of a fluoride component to the anti-corrosion layer on the intermediate metal surface within the specific proportion range obtained by the inventors after a large amount of experimental exploration, verification and confirmation can further improve the initial peel strength of the intermediate metal layer and the heat-fusible resin layer of the metal composite film and the corrosion resistance in a water-free or water-containing electrolyte solution environment.

As shown in FIG. 1, an embodiment of the present disclosure provides a metal composite film comprising a heat-fusible resin layer 8, an inner-layer adhesive layer 7, a corrosion-resistant layer 6, an intermediate metal layer 5, an outer corrosion-resistant layer 4, a colored layer 3, an outer-layer adhesive layer 2, and an outer substrate resin layer 1, in an order going outward from a cell. The structure of the outer packaging material for the battery apparatus according to some embodiments of the present disclosure is described below.

Outer Substrate Resin Layer 1:

In the present disclosure, the outer substrate resin layer 1 is disposed with the intention of functioning as a substrate of a packaging material for lithium-ion batteries. The outer substrate resin layer 1 is positioned on the outer side of the packaging material for lithium-ion batteries.

The raw material for forming the outer substrate resin layer 1 is not particularly limited as long as it at least provides insulation as a substrate.

There is a number of methods for preparing the outer substrate resin layer 1. For example, the outer substrate resin layer 1 may be a resin film product formed directly of a resin, or may be a resin-coated product. The resin film may be an unstretched film or a stretched film. The stretched film may be a uniaxially stretched film or a biaxially stretched film, optionally a biaxially stretched film. Examples of the method for producing the biaxially stretched film include, for example, a stepwise biaxial stretching method, a blown film method, and a simultaneous stretching method. Examples of the resin coating method include, for example, a roll coating method, a microgravure coating method, and an extrusion coating method.

Examples of the resin for forming the outer substrate resin layer 1 include resins such as polyester, polyamide, polyolefin, epoxy resin, acrylic resin, fluororesin, polyurethane, silicone resin and phenol-formaldehyde resin, and modified products of these resins. In addition, the resin for forming the outer substrate resin layer 1 can be a copolymer of these resins, a modified product of the copolymer, or a mixture of these resins; a single layer or multiple layers is/are preferred.

Examples of the resin for forming the outer substrate resin layer 1 optionally include polyesters and polyamides.

Examples of the polyester include polyethylene terephthalate, polybutylene terephthalate, polyethylene naphthalate, polyethylene isophthalate, copolymerized polyester, and the like. In addition, examples of the copolymerized polyester include, for example, copolymerized polyester with ethylene terephthalate as the main repeat unit. In some embodiments, examples of the copolymerized polyester include copolymerized polyester formed by polymerizing ethylene terephthalate as the main repeat unit with ethylene isophthalate (hereinafter, referred to as copolymerized polyester(terephthalate/isophthalate)), copolymerized polyester (terephthalate/adipate), copolymerized polyester(terephthalate/sodium isophthalate), copolymerized polyester (terephthalate/phenyl-dicarboxylate), copolymerized polyester(terephthalate/decanedicarboxylate), and the like. These polyesters may be used alone, or may also be used in a combination of two or more.

In addition, in some embodiments, examples of the polyamide include aliphatic polyamides such as nylon 6, nylon 66, nylon 610, nylon 12, nylon 46, and copolymers of nylon 6 and nylon 66; hexamethylenediamine-isophthalic acid-terephthalic acid copolymerized polyamide comprising a structural unit derived from terephthalic acid and/or isophthalic acid, such as nylon 6I, nylon 6T, nylon 6IT, and nylon 6I6T (I represents isophthalic acid, and T represents terephthalic acid), and aromatic polyamides such as polyamide MXD6 and polyamide PACM6 (polybis(4-aminocyclohexyl)methane azide amide). These polyamides may be used alone, or may also be used in a combination of two or more.

The outer substrate resin layer 1 optionally comprises at least one of a polyester film, a polyamide film and a polyolefin film, and optionally comprises at least one of a stretched polyester film, a stretched polyamide film and a stretched polyolefin film. In some embodiments, the outer substrate resin layer 1 optionally comprises at least one of a stretched polyethylene terephthalate film, a stretched polybutylene terephthalate film, a stretched nylon film and a stretched polypropylene film; in some embodiments, the outer substrate resin layer 1 optionally comprises at least one of a biaxially stretched polyethylene terephthalate film, a biaxially stretched polybutylene terephthalate film, a biaxially stretched nylon film and a biaxially stretched polypropylene film.

The outer substrate resin layer 1 may consist of one layer or two or more layers. When the outer substrate resin layer 1 consists of two or more layers, the outer substrate resin layer 1 may be a composite film formed by the action of an adhesive, or may be a resin composite film formed by co-extruding resins into two or more layers. In addition, a resin composite film formed by co-extruding resin into two or more layers may be used in an unstretched state as the outer substrate resin layer 1, or may be uniaxially or biaxially stretched before use as the outer substrate resin layer 1.

Examples of the laminate of two or more resin films in the outer substrate resin layer 1 include a composite film of a polyester film and a nylon film, a composite film of two or more layers of nylon, a composite film of two or more layers of polyester, and the like. It is optionally a laminate of a stretched nylon film and a stretched polyester film, a composite film of two or more layers of stretched nylon, or a composite film of two or more layers of stretched polyester. For example, when the outer substrate resin layer is a composite film of two layers of resin, it is optionally a composite film of a polyester resin film and a polyester resin film, a composite film of a polyamide resin film and a polyamide resin film, or a composite film of a polyester resin film and a polyamide resin film, optionally a composite film of a polyethylene terephthalate film and a polyethylene terephthalate film, a composite film of a polybutylene terephthalate film and a polybutylene terephthalate film, a composite film of a nylon film and a nylon film, or a composite film of a polyethylene terephthalate film and a nylon film. In addition, the polyester resin is less likely to discolor when an electrolyte solution adheres to the surface; therefore, when the outer substrate resin layer 1 is a composite film of two or more layers of resin, the polyester resin film is optionally positioned at the outermost layer of the outer substrate resin layer 1.

When the outer substrate resin layer 1 is a composite film of two or more layers of resin, the film of two or more layers of resin may be compounded using an adhesive. As an optional adhesive, a glue of the same composition as the outer-layer adhesive may be used. In addition, the method for compounding the film of two or more layers of resin is not particularly limited; dry compounding, sandwich compounding, extrusion compounding, thermal compounding, and the like, optionally dry compounding, may be used. When dry compounding is used, a reactive polyurethane adhesive is optionally used as a reactive adhesive for the outer layer. At this time, the adhesive layer may have a thickness of about 2-5 μm. When a resin coating method is used to form the outer substrate resin layer, the outer substrate resin layer can be formed by first dissolving the resin in an organic solvent and then performing coating with the solution. The coating resin may be a polyamide resin, a polyimide resin, a polyurethane resin, an epoxy resin, an acrylic resin, a polyester resin, a polyamide resin, a polyimide resin, a fluorine-based copolymerized resin, a phenol resin such as a polyester resin, a polyester resin, a polycarbonate resin, or an amino resin such as a urea resin and a melamine resin.

Furthermore, additives such as one or more of a lubricant, a fire retardant, an anti-adhesion agent, an antioxidant, a photostabilizer, a tackifier and an antistatic agent may be added to the surface or the interior of the outer substrate resin layer 1.

From the viewpoint of improving the formability of the packaging material for lithium-ion batteries, a layer consisting of a lubricant is optionally formed on the surface of the outer substrate resin layer 1. The lubricant is not particularly limited. In some embodiments, the lubricant is an amide-based lubricant. The amide-based lubricant includes a saturated fatty acid amide, an unsaturated fatty acid amide, a substituted amide, a hydroxymethyl amide, a saturated fatty acid bisamide, an unsaturated fatty acid bisamide, a fatty acid amide, an aromatic bisamide, and the like. Examples of the saturated fatty acid amide include lauramide, palmitamide, stearamide, behenamide, hydroxystearamide, and the like. Examples of the unsaturated fatty acid amide include oleamide, erucamide, and the like. The substituted amide includes N-oleyl palmitamide, N-stearamide, N-stearamide, N-oleyl stearamide, and N-stearamide. In addition, the hydroxymethyl amide includes hydroxymethyl stearamide and the like. The saturated fatty acid bisamide includes methylene-bis-stearamide, ethylene-bis-caprylamide, ethylene-bis-lauramide, ethylene-bis-stearamide, ethylene-bis-hydroxystearamide, ethylene-bis-behenamide, hexamethylene-bis-stearamide, hexamethylene-bis-behenamide, hexamethylene-hydroxystearamide, N,N'-distearyladipamide, N,N'-distearylsebacamide, and the like. The unsaturated fatty acid bisamide includes ethylene-bis-oleamide, ethylene-bis-erucamide, hexamethylene-bis-oleamide, N,N'-dioleyladipamide, and N,N'-dioleylsebacamide. The fatty acid ester amide includes stearamide ethyl stearate and the like. In addition, the aromatic bisamide includes m-xylylene-bis-stearamide, m-xylylene-bis-hydroxystearamide, N,N'-distearylisophthalamide, and the like. The lubricants may be used alone, or may also be used in a combination of two or more.

When a lubricant is present on the surface of the outer substrate resin layer 1, the amount of coating is not particularly limited; for example, the amount of coating is about 3 $mg/m^2$ or greater, for example, 3 $mg/m^2$, 4 $mg/m^2$, 5 $mg/m^2$, 8 $mg/m^2$, 10 $mg/m^2$, 12 $mg/m^2$, 14 $mg/m^2$, 16 $mg/m^2$, 18 $mg/m^2$, 20 $mg/m^2$, 22 $mg/m^2$, 24 $mg/m^2$, 26 $mg/m^2$, 28 $mg/m^2$, 30 $mg/m^2$; for example, the amount of coating is about 4-30 $mg/m^2$, for example, 5-30 $mg/m^2$, 5-25 $mg/m^2$, 5-20 $mg/m^2$, 5-15 $mg/m^2$ or 5-10 $mg/m^2$.

The lubricant present on the surface of the outer substrate resin layer 1 may be a lubricant that has oozed out of the substrate resin layer comprising the lubricant, or may be a lubricant that coats the surface of the outer substrate resin layer 1.

The thickness of the outer substrate resin layer 1 is not particularly limited as long as it functions as a substrate. When the outer substrate resin layer 1 is a composite film of two or more layers of resin, each of the layers optionally has a thickness of about 2-30 μm, for example, 5-30 μm, 5-25 μm, 10-30 μm, 15-30 μm or 20-30 μm, such as 2 μm, 5 μm, 10 μm, 15 μm, 18 μm, 20 μm, 23 μm, 25 μm, 28 μm or 30 μm.

In the present disclosure, the outer substrate resin layer 1 may be a composite film of one or two or more layers formed of one or more of polymer materials such as blown film nylon, synchronously or asynchronously biaxially stretched nylon, synchronously or asynchronously biaxially stretched polyethylene terephthalate (PET), synchronously or asynchronously biaxially stretched polybutylene terephthalate (PBT) and polyimide (PI). The outer substrate resin layer 1 can be bonded to the intermediate metal layer 5 by one of extrusion, coating, compounding and thermal bonding or a combination thereof. The outer substrate resin layer 1 has a total thickness of 5-35 μm. In the case that the total thickness of the substrate resin layer 1 is within the above range, not only are better formability and insulativity obtained, but also the flexibility is improved. In the case that the thickness is less than 5 μm, the formability and insulativity are relatively poor. In addition, if the thickness exceeds 35 μm, the total thickness of the metal composite film is too large, and the flexibility, which is an advantage of the metal composite film, becomes poor.

Outer-Layer Adhesive Layer 2:

In the packaging material for lithium-ion batteries of the present disclosure, an outer-layer adhesive layer 2 is disposed in the case that the outer substrate resin layer 1 is compounded with the intermediate metal layer 5. The outer-layer adhesive layer 2 is formed with the intention of increasing the adhesion between the outer substrate resin layer 1 and the intermediate metal layer 5.

The outer-layer adhesive layer 2 is formed of an adhesive capable of bonding the outer substrate resin layer 1 and the intermediate metal layer 5. The adhesive used for forming the outer-layer adhesive layer 2 is not limited, and may be, for example, a bi-component curable adhesive (bi-component adhesive), and in addition, may also be a mono-component curable adhesive (mono-component adhesive). Moreover, the adhesive used for forming the outer-layer adhesive layer 2 may be any one of a chemical reaction type, a solvent volatilization type, a hot-melt type, a hot-press type, and the like. In addition, the outer-layer adhesive layer 2 may consist of one or more layers.

The outer-layer adhesive layer 2 is a bi-component polyurethane adhesive formed by using a polyester polyol, a polyurethane-modified polyol, etc. as diol main agents and using an aromatic or aliphatic isocyanate as a curing agent. The curing agent may be selected according to the functional groups of the adhesive component; for example, it may be appropriately selected from a polyfunctional epoxy resin, a methanesulfonic acid-containing polymer, a primary amine, a polyamine resin, an inorganic acid, and the like. In addition, the main agents used for the outer-layer adhesive layer include polyester resins such as polyethylene terephthalate, polybutylene terephthalate, polyethylene naphthalate, polyethylene isophthalate and copolymerized polyester; polyether resins; polyurethane resins; epoxy resin; phenol-formaldehyde resin; polyamide resins such as nylon 6, nylon 66, nylon 12, and copolymerized polyamide; polyolefin-based resins such as polyolefin, cyclic polyolefin, acid-modified polyolefin and acid-modified cyclic polyolefin; polyvinyl acetate; cellulose; (meth)acrylic resins; polyimide resins; polycarbonate; amino resins such as urea resin and melamine resin; rubbers such as chloroprene rubber, nitrile rubber and styrene-butadiene rubber; silicone resins, and the like. These adhesive components may be used alone, or may also be used in a combination of two or more.

An optional combination for the outer-layer adhesive layer 2 in the present disclosure is a bi-component or multi-component combination comprising one or two of a polyester and a polyurethane-modified polyester and comprising an isocyanate. The isocyanate is not particularly limited to a compound having two or more isocyanate groups in the molecule. For example, the isocyanate is one of or a mixture of two or more of polymers such as isophorone diisocyanate (IPDI), toluene diisocyanate (TDI), diphenylmethane-4,4'-diisocyanate (MDI) and 1,6-hexane diisocyanate (HDI).

In addition, other components are allowed for addition to the outer-layer adhesive layer 2 as long as they do not interfere with adhesion, including a colorant, a thermoplastic elastomer, a tackifier, a filler, and the like. The packaging material for lithium-ion batteries can be colored by making the outer-layer adhesive layer 2 comprise a colorant. Colorants such as pigments and dyes can be used. In addition, the colorants may be used alone, or may also be used in a combination of two or more.

The pigment is not particularly limited as long as the range of adhesion of the outer-layer adhesive layer 2 is not impaired. Examples of the organic pigment include an azo-based pigment, a phthalocyanine-based pigment, a quinacridone-based pigment, an anthraquinone-based pigment, a dioxazine-based pigment, a thioindigo-based pigment, a perylene-based pigment, an isoindoline-based pigment, and the like, and examples of the inorganic pigment include a carbon black-based pigment, a titanium oxide-based pigment, a cadmium-based pigment, a lead-based pigment, an isoindoline-based pigment, and the like.

For example, to make the packaging material for lithium-ion batteries have a black appearance, the colorant is optionally carbon black.

The average particle size of the pigment is not particularly limited, and may be about 0.05-5 μm, for example, 0.08-5 μm, 0.1-4 μm, 0.5-3 μm, 1-2 μm, 0.05-4 μm or 0.05-3 μm, for example, 0.05 μm, 0.060 μm, 0.07 μm, 0.08 μm, 0.1 μm, 1.2 μm, 1.4 μm, 1.6 μm, 1.8 μm, 2 μm, 3 μm, 4 μm or 5 μm, for example, about 0.08-2 μm. In addition, the average particle size of the pigment is a median particle size measured by a laser diffraction/scattering particle size distribution measuring apparatus.

The pigment content of the outer-layer adhesive layer 2 is not particularly limited as long as the packaging material for lithium-ion batteries is colored; for example, the pigment content is about 5-60%, for example, 10-40%.

The thickness of the outer-layer adhesive layer 2 is not particularly limited as long as the outer substrate resin layer 1 and the intermediate metal layer 3 can be bonded; examples of optional ranges include about 1-10 μm, for example, 1-5 μm, 3-10 μm or 3-8 μm, such as 1 μm, 2 μm, 3 μm, 4 μm, 5 μm, 6 μm, 7 μm, 8 μm, 9 μm or 10 μm. For example, the outer-layer adhesive layer 2 has a thickness of about 2-5 μm.

Colored Layer 3:

The colored layer 3 is a layer disposed between the outer substrate resin layer 1 and the intermediate metal layer 5 as needed. A colored metal composite film may be formed by directly adding a pigment to the outer-layer adhesive layer 2, or forming the colored layer 3 between the outer substrate resin layer 1 and the outer-layer adhesive layer 2. In addition, the colored layer 3 may also be disposed on the outer side of the outer substrate resin layer 1.

The colored layer 3 may be formed by, for example, coating the surface of the outer substrate resin layer 1, the surface of the outer-layer adhesive layer 2, or the surface of the intermediate metal layer 5 with an ink comprising a colorant. Colorants such as pigments and dyes can be used. In addition, the colorants may be used alone, or may also be used in a combination of two or more.

Examples of the colorant comprised in the colored layer 3 may be those for the outer-layer adhesive layer 2.

Intermediate Metal Layer 5:

In the outer packaging material for lithium-ion batteries, the intermediate metal layer 5 is a barrier layer at least capable of preventing moisture penetration.

The metal material used for the intermediate metal layer 5 may be aluminum alloy, stainless steel, titanium steel, a nickel-plated iron sheet, etc., and when used as a metal foil, it may be one or more layers. Optionally, at least one of an aluminum alloy foil, a nickel-plated iron sheet and a stainless steel foil is comprised.

In general, the aluminum alloy foil is more optionally a soft aluminum alloy foil made of annealed aluminum alloy, etc., from the viewpoint of improving the formability of the packaging material for lithium-ion batteries, and is optionally an iron-containing aluminum alloy foil from the viewpoint of further improving the formability. Silica, magnesium, and the like may also be added as needed for resistance to electrolyte solution and the like.

Examples of the stainless steel foil include austenitic, ferritic, austenitic-ferritic, martensitic and precipitationhardening stainless steel foils. From the viewpoint of providing a packaging material for lithium-ion batteries with more excellent formability, the stainless steel foil may be optionally formed of austenitic stainless steel.

Examples of the austenitic stainless steel forming the stainless steel foil include SUS304, SUS301, SUS316L, and the like, optionally SUS304.

When the intermediate metal layer 5 is a metal foil, the thickness can at least fulfill the function of the intermediate metal layer that prevents moisture penetration; the thickness may be, for example, about 9-200 μm, for example, 9-150 μm, 9-100 μm or 9-50 μm, such as 9 μm, 10 μm, 20 μm, 30 μm, 40 μm, 50 μm, 100 μm, 150 μm or 200 μm. The upper limit of the thickness of the intermediate metal layer 3 is optionally about 100 μm or less, for example, about 50 μm or less.

Anti-Corrosion Layer 6:

The anti-corrosion layer 6 in the packaging material for lithium-ion batteries serves to prevent hydrogen fluoride generated by the reaction of the electrolyte with water from corroding the surface of the intermediate metal layer 5, prevent the intermediate metal layer 5 and the heat-fusible resin layer 8 from separation, also maintain the uniformity of the surface of the intermediate metal layer 5, and reduce the change in adhesion (wettability). The anti-corrosion layer has the effect of preventing the intermediate metal layer 5 and the heat-fusible resin layer 8 in the metal composite film from separation. Optionally, at least the surface of the intermediate metal layer 5 on the side opposite to the outer substrate resin side is coated with an anti-corrosion solution to form an anti-corrosion layer. Optionally, anti-corrosion layers are formed on both sides of the intermediate metal layer 5. Forming an anti-corrosion layer on the surface of the intermediate metal layer 5 that comes in contact with the outer substrate resin layer 1 can stabilize the uniformity of the surface of the intermediate metal layer 5 and reduce the change in adhesion (wettability), so that in the case of long-term storage in a high-temperature and high-humidity environment, the total outer substrate resin layer 1 and the intermediate metal layer 5 in the metal composite film are prevented from separation.

The anti-corrosion solution in one embodiment of the present disclosure is an aqueous solution mainly consisting of a trivalent chromium compound, an inorganic acid, an organic resin, an organic solvent and a titanate, wherein the proportions of the trivalent chromium compound, the inorganic acid, the organic resin, the organic solvent, the titanate and water are 2.5-3.8%, 0.1-0.8%, 1-1.2%, 1-2.8%, 0-5% and 91.4-95.4%, respectively. The trivalent chromium compound is selected from chromium fluoride; the inorganic acid consists of at least one of nitric acid and hydrofluoric acid; the organic resin is polyvinyl alcohol; the organic solvent is 2-butoxyethanol. First, at least the side of the intermediate metal layer 5 that comes in contact with the heat-fusible resin layer is degreased by alkali impregnation, electrolytic cleaning, acid cleaning, electrolytic acid cleaning, oxygen activation, heat treatment (annealing treatment) during calendering, etc. Next, the anti-corrosion solution of the present disclosure is applied to, by bar coating, roll coating, gravure coating, impregnation, etc., and allowed to act on, by high-temperature chemical reaction, the surface of the intermediate metal layer 5; the intermediate metal layer 5 coated with the anti-corrosion solution is treated by heat at the high temperature of 130-200° C. for 0.5-5 min to form the anti-corrosion layer 6.

In this embodiment, the titanate is not particularly limited, and may be selected from one or two or more of titanous sulfate, titanium oxysulfate, titanium ammonium sulfate, titanium nitrate, titanium ammonium nitrate, titanium sulfate, fluorotitanic acid and a complex thereof.

In another embodiment of the present disclosure, the anti-corrosion solution is an aqueous solution mainly consisting of a trivalent chromium compound, an inorganic acid, a fluoride and an organic resin, wherein the proportions of the trivalent chromium compound, the inorganic acid, the fluoride, the organic resin and water are 1.9-6%, 0.3-6%, 0-10%, 0.6-6% and 82-97.2%, respectively. The trivalent chromium compound in the anti-corrosion solution consists of at least one of chromium nitrate, chromium phosphate and chromium chloride; the inorganic acid consists of at least one of nitric acid and phosphoric acid; the fluoride consists of at least one of chromium fluoride and aluminum fluoride; the organic resin consists of a polyacrylic acid-based resin, or a polyacrylic acid-based resin and polyvinyl alcohol. The polyacrylic acid-based resin is one or more of polyacrylic acid, polymethyl acrylate, a copolymer of acrylic acid and maleic acid, a copolymer of acrylic acid and styrene, and a derivative such as a sodium or ammonium salt thereof. First, at least the side of the intermediate metal layer 5 that comes in contact with the heat-fusible resin layer is degreased by alkali impregnation, electrolytic cleaning, acid cleaning, electrolytic acid cleaning, oxygen activation, heat treatment (annealing treatment) during calendering, etc. Next, the anti-corrosion solution of the present disclosure is applied to, by bar coating, roll coating, gravure coating, impregnation, etc., and allowed to act on, by high-temperature chemical reaction, the surface of the intermediate metal layer 5; the intermediate metal layer 5 coated with the anti-corrosion solution is treated by heat at the high temperature of 130-200° C. for 0.5-5 min to form the anti-corrosion layer 6.

In any of the above embodiments, the thickness of the anti-corrosion layer 6 is not particularly limited, but in view of the adhesion between the intermediate metal layer 5 and the heat-fusible resin layer 8, the thickness is optionally 1 nm to 3.0 μm, and in some embodiments, 1 nm to 1.5 μm. In addition, the chromium content of the anti-corrosion layer 6 is 8-50 mg/m$^2$, optionally 10-30 mg/m$^2$.

Inner-Layer Adhesive Layer 7:

In the packaging material for lithium-ion batteries of the present disclosure, the inner-layer adhesive layer 7 is an intermediate layer disposed to firmly bond the intermediate metal layer 5 and the heat-fusible resin layer 8.

The inner-layer adhesive layer 7 is formed of a resin capable of bonding the intermediate metal layer 5 and the heat-fusible resin layer 8. The inner heat-fusible resin layer 8 described above may be formed of a polyolefin, a cyclic polyolefin, etc., or may be formed of a modified polyolefin-based resin such as a carboxylic acid-modified polyolefin, a carboxylic acid-modified cyclic polyolefin, a methacrylic acid-modified polyolefin, an acrylic acid-modified polyolefin, a crotonic acid-modified polyolefin or an imide-modified polyolefin. From the viewpoint of improving the adhesion between the intermediate metal layer and the inner heat-fusible resin layer, the modified polyolefin may be optionally a modified polyolefin resin such as acrylic acid, methacrylic acid, maleic acid, anhydrous maleic anhydride or a polyamide. The resin forming the inner-layer adhesive layer may or may not comprise a polyolefin backbone, and optionally comprises a polyolefin backbone. Whether the resin forming the inner-layer adhesive layer 7 comprises a polyolefin backbone or not can be determined, for example, by infrared spectrophotometry analysis, gas chromatography-mass spectrometry analysis, etc., and the analysis method is not particularly limited. The polyolefin and the modified resin thereof used in the inner-layer adhesive are the same as those used in the heat-fusible resin layer 8, and they are polypropylene resins or copolymers of propylene and ethylene.

From the viewpoint of the stability of the packaging material for lithium-ion batteries in long-term use, the inner-layer adhesive layer 7 may also be a resin composition comprising an acid-modified polyolefin and a curing agent. The acid-modified polyolefin is particularly optionally maleic anhydride or an acrylic acid-modified polyolefin.

The curing agent is not particularly limited as long as it is a curing agent for curing the acid-modified polyolefin. An epoxy-based curing agent, a polyfunctional isocyanate-based curing agent, a carbodiimide-based curing agent, an oxazoline-based curing agent, etc. can be used.

The epoxy-based curing agent is not particularly limited as long as it is a compound having at least 1 epoxy group. For example, an epoxy resin such as bisphenol A diglycidyl ether, modified bisphenol A diglycidyl ether, novolak glycidyl ether, glycerol polyglycidyl ether or polyglycerol polyglycidyl ether is used.

The polyfunctional isocyanate-based curing agent is not particularly limited as long as it is a compound having two or more isocyanate groups in the molecule. For example, isophorone diisocyanate (PDI), hexamethylene diisocyanate (HDI), toluene diisocyanate (TDI), diphenylmethane diisocyanate (MDI), a component after polymerization or addition of the above substances, or a reactant of such a mixture with other polymers is used.

The carbodiimide-based curing agent is not particularly limited as long as it is a compound having at least one carbodiimide group (—N═C═N—) in the molecule. The carbodiimide-based curing agent is optionally a polycarbodiimide compound having at least two or more carbodiimide groups.

The oxazoline-based curing agent is not particularly limited as long as it is a compound having an oxazoline backbone.

From the viewpoint of improving the adhesion between the inner-layer adhesive layer 7 and the heat-fusible resin layer 8, the curing agent may also consist of two or more compounds.

The thickness of the inner-layer adhesive layer 7 is not particularly limited as long as it fulfills the function of the adhesive layer; the thickness is optionally about 1-80 μm, for example, 10-80 μm, 20-80 μm, 20-70 μm or 20-60 μm. In some embodiments, the thickness of the inner-layer adhesive layer 7 is optionally about 1-50 μm.

The main component of the inner-layer adhesive layer 7 of the present disclosure is a single film layer or two or more film layers formed of one of or a mixture of two or more of a modified polyolefin resin, a polyolefin resin, and a block copolymer polypropylene resin (B-PP), a random copolymer polypropylene resin (R-PP) and a homopolymer polypropylene resin (H-PP) having a polypropylene (PP) content of more than 50%.

When the intermediate metal layer 5 is compounded with the heat-fusible resin layer 8 using the inner-layer adhesive layer 7, a method for a solution-type inner-layer adhesive layer 7 can be used, or a method for a hot-melt inner-layer adhesive resin layer 7 can be used.

The solution-type inner-layer adhesive layer 7 is formed by using an acid-modified polyolefin resin as a main agent, using one or two or more of an isocyanate, an epoxy resin, an oxazoline, etc. as a solidifier, or using an amine compound such as triethylamine or N,N-dimethylethanolamine as a curing agent, dissolving the above agents in at least one or two or more of solvents such as water, ethanol, isopropanol, ethyl acetate, methyl ethyl ketone, toluene and methylcyclohexane, then uniformly coating the metal surface, which has been subjected to anti-corrosion treatment, with the solution, and volatilizing the solvent(s) by heat so that the thickness of the inner-layer adhesive layer 7 achieves the desired effect. The thickness is optionally about 1-10 μm and optionally 1-5 μm. In the case that the thickness of the inner-layer adhesive layer 7 is within the above range, not only can the adhesion between the intermediate metal layer 5 and the heat-fusible resin layer 8 be ensured, but also the bending resistance and flexibility of the metal composite film are improved even in the case of reaction with the curing agent, so that the risk that bending may cause cracks is avoided, and the intermediate metal layer 5 and the heat-fusible resin layer 8 are effectively prevented from peeling apart. In the case that the thickness is less than 1 μm, the small thickness leads to a low level of adhesion between the intermediate metal layer 5 and the heat-fusible resin layer 8, which will be a problem. In the case that the thickness exceeds 10 μm, there is no problem with adhesion, but a hard resin layer will be formed in the case of reaction with the curing agent, resulting in poor bending resistance and accordingly poor flexibility in the metal composite film, such that there is a risk that bending may cause cracks, and the intermediate metal layer 5 and the heat-fusible resin layer 8 may peel apart. The acid-modified polyolefin resin in the solution-type inner-layer adhesive 7 has a melting point of 60-155° C. and a weight-average molecular weight of 10,000-150,000, and the solution-type inner-layer adhesive has an acid value of 0.5-200 mg KOH/g. When an amine compound is used as the curing agent, the solution-type inner-layer adhesive mainly consists of the acid-modified polyolefin resin and the amine compound, and the acid-modified polyolefin and the amine compound are in a ratio of 10:1 to 125:1, optionally 15:1 to 50:1. The acid used for modifying the polyolefin is maleic acid, fumaric acid, methacrylic acid, etc.; the amine compound is at least one of triethylamine and N,N-2 methylethanolamine. The acid-modified polyolefin resin is a single layer or multiple layers consisting of one of or a blend of more of a block copolymer polypropylene resin (B-PP), a random copolymer polypropylene resin (R-PP) and a homopolymer polypropylene resin (H-PP) having a melting point of above 110° C. and a polypropylene content of greater than 50%.

In the case that the melting point is within the above range, not only can the intermediate metal layer 5 and the heat-fusible resin layer 8 be prevented from peeling apart at high temperature, but also the flexibility and bendability of the metal composite film are improved in the case of reaction with the curing agent, so that cracks are effectively prevented during bending, and the intermediate metal layer 5 and the heat-fusible resin layer 8 are prevented from peeling apart. If the melting point is 60° C. or lower, the heat resistance is low, and the intermediate metal layer 5 and the heat-fusible resin layer 8 may peel apart at high temperature. In addition, if the melting point exceeds 155° C., the heat resistance is good, but a hard resin layer will be formed in the case of reaction with the curing agent, resulting in poor bendability and accordingly poor flexibility in the metal composite film; or bending may cause cracks, and the intermediate metal layer 5 and the heat-fusible resin layer 8 may peel apart. In the case that the average molecular weight is within the above range, not only can the thickness of the resin be ensured during heat sealing, but also the adhesive strength and tightness between the intermediate metal layer 5 and the heat-fusible resin layer 8 are ensured, and the flexibility and bending resistance of the metal composite film are also improved, and the flexibility of the metal composite film is increased; or cracks are prevented during bending, and the intermediate metal layer 5 and the heat-fusible resin layer 8 are effectively prevented from peeling apart. If the weight-average molecular weight is 10,000 or less, the resin fluidity is high during heating, and the thickness becomes extremely small during heat sealing, such that the adhesive strength between the intermediate metal layer 5 and the heat-fusible resin layer 8 (in the case of reaction with the curing agent) becomes low, causing a tightness problem. If the weight-average molecular weight exceeds 150,000, the intermediate metal layer 5 and the heat-fusible resin layer 8 (in the case of reaction with the curing agent) form a hard resin layer, which results in poor bending resistance and accordingly poor flexibility in the metal composite film; or bending may cause cracks, and the intermediate metal layer 5 and the heat-fusible resin layer 8 may peel apart. In the case that the acid value of the acid-modified polyolefin resin is within the above range, the acid-modified polyolefin resin can fully react with the curing agent, so that the adhesion between the intermediate metal layer 5 and the heat-fusible resin layer 8 is ensured, and the flexibility and bending resistance of the metal composite film are also improved; or cracks are prevented during bending, and the intermediate metal layer 5 and the inner heat-fusible resin layer 8 are prevented from peeling apart. If the acid value of the acid-modified polyolefin resin is less than 0.5 mg KOH/g, there are few points of curing reaction with the curing agent, such that the adhesion between the intermediate metal layer 5 and the heat-fusible resin layer 8 is unstable. If the acid value exceeds 200 mg KOH/g, the curing reaction between the curing agent and the acid-modified polyolefin resin is too intense, leading to formation of a hard resin layer, which causes poor bending resistance and poor flexibility in the metal composite film; or bending causes cracks, and the intermediate metal layer 5 and the inner heat-fusible resin layer 8 may peel apart.

The inner-layer adhesive layer 7 used for the intermediate metal layer 5 and the heat-fusible resin layer 8 may also be a hot-melt inner-layer adhesive. The resin used for the hot-melt inner-layer adhesive layer 7 is an acid-modified polyolefin resin having a melting point of 135-165° C. and an MFR (230° C.) of 3-15 g/10 min. The formed inner-layer adhesive layer 7 has a thickness of 2-80 μm, optionally 5-50 μm. The acid-modified polyolefin resin used for the hot-melt inner-layer adhesive has a degree of modification of 1% to 15%. For example, the degree of modification is 1% to 10%, 5% to 15%, or 5% to 10%, such as 1%, 3%, 5%, 7%, 9%, 10%, 12%, 14% or 15%. In some embodiments, the degree of modification is optionally 3% to 12%. When the melting point of the acid-modified polyolefin resin is within the above range, it can be ensured that the resin has good fluidity during heating, and that the adhesive strength between the intermediate metal layer 5 and the heat-fusible resin layer 8 is good during heat sealing under pressure, and thus the tightness is improved; the ability of the hot-melt inner-layer adhesive to adhere to the intermediate metal layer 5 is also effectively improved. When the melting point of the acid-modified polyolefin resin is 135° C. or lower, the resin fluidity increases during heating, and the thickness becomes too small during heat sealing under pressure, such that the adhesive strength between the intermediate metal layer 5 and the heat-fusible resin layer 8 becomes low, causing a tightness problem. When the melting point is 165° C. or higher, the fluidity is relatively low during heat sealing under pressure, and the heat resistance is improved, but when the adhesive is compounded with the intermediate metal layer 5, the heat shrinkage increases, causing an increase in internal stress and thus a reduction in the ability of the hot-melt inner-layer adhesive to adhere to the intermediate metal layer 5. Therefore, in the case of long-term storage, the adhesive and the intermediate metal layer 5 may peel apart. In addition, since the heat shrinkage further increases due to heating during heat sealing, the adhesion to the intermediate metal layer 5 is reduced, and thus the sealing strength becomes low, causing a big problem with tightness. If the MFR (230° C.) of the acid-modified polyolefin resin is less than 3 g/10 min, the extrusion film formability is likely to be unstable when the resin is hot-melted and then extruded and compounded with the intermediate metal layer 5. If the MFR (230° C.) of the acid-modified polyolefin resin is higher than 15 g/10 min, the resin fluidity increases during heating, and the thickness becomes too small during heat sealing under pressure, such that the adhesive strength between the intermediate metal layer 5 and the heat-fusible resin layer 8 becomes low, causing a tightness problem. When the thickness of the hot-melt inner-layer adhesive layer 7 is less than 2 μm, the heat shrinkage is too much to be absorbed when the adhesive layer is compounded with the intermediate metal layer 5. Therefore, the increase in internal stress causes a reduction in the adhesion to the intermediate metal layer 5. In the case of long-term storage, the adhesive and the intermediate metal layer 5 may peel apart. When the thickness of the hot-melt inner-layer adhesive layer 7 exceeds 80 μm, no physical problem will be caused, but production costs will increase; therefore, it is better not to use such a thickness. When the degree of modification of the hot-melt inner-layer adhesive layer 7 is less than 1%, the adhesion to the intermediate metal layer 5 is unstable. If the degree of modification exceeds 15%, no physical problem will be caused, but production costs will increase; therefore, it is better to avoid such a case.

An embodiment of the present disclosure discloses a compounding process for a metal composite film, which comprises the following steps:

Deoiling of the intermediate metal layer 5: The intermediate metal layer 5 has a surface wettability of 65 dyn/cm or higher, optionally 70 dyn/cm or higher; or has a distilled water contact angle of 15° or smaller, optionally 10° or smaller. If the wettability or surface water contact angle of the intermediate metal layer 5 is beyond a given range, it indicates that there is a possibility that a residue of the calendering oil in the manufacturing stage is on the metal; therefore, the adhesion ability of the interfaces formed between the anti-corrosion layer 6, the intermediate metal layer 5 and the heat-fusible resin layer 8 becomes poor, and during long-term storage of the battery, there is a risk that the intermediate metal layer 5 and the heat-fusible resin layer 8 may peel off, which easily causes such problems as a leakage from the battery. As a preventative measure, annealing treatment may be performed at 150° C. or higher, or deoiling may be performed using plasma, a corona method or alkaline solution. The method of deoiling with alkali comprises: impregnating the metal with a 50-65° C. alkaline solution, and after a certain period of treatment, washing the metal twice with deionized water and then drying the metal to give a deoiled metal.

Formation of the anti-corrosion layer 6 on the intermediate metal layer 5: The surface of the side of the intermediate metal layer 5 in contact with the heat-fusible resin layer 8 is coated with the anti-corrosion solution and then treated by heat at high temperature for a period of time.

Formation and compounding of the outer-layer adhesive layer 2: A polyurethane-based adhesive dissolved in an organic solvent is applied between the intermediate metal layer 5 and the outer substrate resin layer 1, and the organic solvent is volatilized by heating at a certain temperature for a certain period of time to form the outer-layer adhesive layer 2. In some embodiments, the outer substrate resin layer 1, the outer-layer adhesive layer 2 and the intermediate metal layer 5 are compounded at a certain temperature and a certain pressure, and after storage at a certain temperature for a certain period of time, the outer-layer adhesive layer 2 is subjected to a curing reaction to give a composite resin layer consisting of the outer substrate resin layer 1, the outer-layer adhesive layer 2 and the intermediate metal layer 5. When the outer-layer adhesive is not used to compound the outer substrate resin layer 1 and the intermediate metal layer 5, the intermediate metal layer 5 and the outer substrate resin layer 1 are compounded by heat and pressure. The outer substrate resin layer is allowed to form a film by heat treatment, ultraviolet treatment or electron beam treatment, so that a composite resin layer consisting of the outer substrate resin layer 1 and the intermediate metal layer 5 is obtained.

Compounding with the heat-fusible resin layer 8: The composite film consisting of the outer substrate resin layer 1 and the intermediate metal layer 5 can be appropriately selected to be compounded with the heat-fusible resin layer 8 in different compounding ways, as exemplified below:

a. Dry compounding: A solution-type inner-layer adhesive consisting of a main agent, a curing agent and an organic solvent is applied to the anti-corrosion surface of the intermediate metal layer 5 of the composite film consisting of the outer substrate resin layer 1 and the intermediate metal layer 5. The solution-type inner-layer adhesive is dried to form the inner-layer adhesive layer 7. The inner-layer adhesive layer 7 is thermally compounded with the adhesive surface of the heat-fusible resin layer 8 at a certain temperature and a certain pressure. After curing treatment, a composite product of outer substrate resin layer/outer-layer adhesive layer/intermediate metal layer/inner-layer adhesive layer/heat-fusible resin layer is formed. Optionally, the adhesive surface of the heat-fusible resin layer 8 in contact with the inner-layer adhesive layer 7 is subjected to corona treatment in advance. In addition, curing treatment may be performed at a temperature that is not more than 60° C. above the melting point of the inner-layer adhesive layer 7.

b. Melt extrusion: A resin for the hot-melt inner-layer adhesive is allowed to form, by melt extrusion, a hot-melt inner-layer adhesive layer 7 of a certain thickness on the anti-corrosion surface of the intermediate metal layer 5. In addition, the surface of the inner-layer adhesive layer 7 is thermally compounded with the adhesive surface of the heat-fusible resin layer 8 to form a composite product of outer substrate resin layer/outer-layer adhesive layer/intermediate metal layer/inner-layer adhesive layer/heat-fusible resin layer. To increase the peel strength between the intermediate metal layer 5 and the heat-fusible resin layer 8, heat treatment may be performed at a temperature that is not more than 60° C. above the melting point of the inner-layer adhesive layer 7.

c. Melt extrusion: The hot-melt inner-layer adhesive layer 7 and the heat-fusible resin layer 8 are allowed to form, by co-extrusion, a composite product of outer substrate resin layer/outer-layer adhesive layer/intermediate metal layer/inner-layer adhesive layer/heat-fusible resin layer. After the surface of the intermediate metal layer 5 in contact with the inner-layer adhesive layer 7 is subjected to anti-corrosion treatment, to increase the peel strength between the intermediate metal layer 5 and the heat-fusible resin layer 8, heat treatment may be performed at a temperature that is not more than 60° C. above the melting point of the inner-layer adhesive layer 7.

d. Thermal bonding: A resin main agent having a melting point of 100° C. or higher and a curing agent are dissolved in an aqueous or organic solvent to form an aqueous solution-type inner-layer adhesive. The aqueous solution-type inner-layer adhesive is applied to the anti-corrosion treated surface of the metal layer of the composite layer consisting of the outer substrate resin layer 1 and the intermediate metal layer 5 and dried to form the inner-layer adhesive layer 7. At a certain temperature and a certain pressure, the inner-layer adhesive layer 7 is thermally compounded with the adhesive surface of the heat-fusible resin layer 8 to form a composite product of outer substrate resin layer/outer-layer adhesive layer/intermediate metal layer/inner-layer adhesive layer/heat-fusible resin layer. To increase the peel strength between the intermediate metal layer 5 and the heat-fusible resin layer 8, heat treatment may be performed at a temperature that is not more than 60° C. above the melting point of the inner-layer adhesive layer 7. The heat-fusible resin layer 8 may also be formed by pressing, or a film may also be used. When a film is used, the adhesive surface of the heat-fusible resin layer 8 in contact with the inner-layer adhesive layer 7 is optionally subjected to corona treatment in advance.

The present disclosure is described in detail below using examples.

In the following examples and comparative examples, the peel strength between the intermediate metal layer 5 and the heat-fusible resin layer 8 of the finished metal composite film was measured as follows:

(1) Initial Peel Strength Test

The finished metal composite film was prepared into straight strips of size 100×15 mm. A peel test for the intermediate metal layer 5 and the heat-fusible resin layer 8 was performed using a tensile test apparatus. The heat-fusible resin layer 8 film that had been peeled off for 50 mm was put into an upper grip of the tensile test apparatus, and the intermediate metal layer 5 was put into a lower grip. Then T-peeling was performed with a 180° plane of peeling at a stretching rate of 50 mm/min, and the measurement of the peel strength between the intermediate metal layer 5 and the heat-fusible resin layer 8 was started. The peel strength was read in such a way that: the moving distance of the heat-fusible resin layer 8 and the intermediate metal layer 5 was 50 mm and the average value of peel strength at moving distances of between 10 mm and 40 mm was selected. Parallel tests were performed with 5 samples/group.

(2) Water-Free Electrolyte Solution Resistance Test

Sample strips (size: 100×15 mm) of the finished metal composite film were directly immersed in a mixed solvent of dimethyl carbonate (DMC), diethyl carbonate (DEC) and ethylene carbonate (EC) (mole ratio: 1:1:1) containing 1 mol/L $LiPF_6$ at a temperature of 85° C. for 3 days, taken out, washed with water for 15 min and dried. The peel strength between the intermediate metal layer 5 and the heat-fusible resin layer 8 was measured according to the test method for the initial peel strength of the finished product in (1).

(3) Water-Containing Electrolyte Solution Resistance Test

The metal composite film was cut into sample strips of size 15 mm width and 100 mm length. The intermediate metal layer and the inner heat-fusible resin layer were peeled apart for 50 mm and then immersed in a mixed solvent of dimethyl carbonate (DMC), diethyl carbonate (DEC) and ethylene carbonate (EC) (mole ratio: 1:1:1) containing 1 mol/L $LiPF_6$, and water was then added to the electrolyte solution to 1000 PPM (by mass). The sample was immersed at 85° C. for 3 days, then taken out, washed with water for 15 min and left undried. With some residual water between the intermediate metal layer 5 and the intermediate metal layer 8 which were peeled apart in advance, the peel strength between the intermediate metal layer 5 and the heat-fusible resin layer 8 was measured according to the test method for the initial peel strength of the finished product in (1); the measurement began at the position where the advance peeling ended.

The implementation of specific embodiments of the present disclosure is provided below:

1. Compounding

The metal composite film consists of an outer substrate resin layer, an outer-layer adhesive layer (3 μm), an intermediate metal layer, an inner-layer adhesive layer and a heat-fusible resin layer. The thickness of the outer substrate resin layer 1 and the intermediate metal layer 5 may vary according to individual examples.

Lamination method: The outer substrate resin layer 1 film in contact with the outer-layer adhesive layer 2 was subjected to corona treatment. One side of a metal foil (an aluminum foil, nickel-plated iron foil or stainless steel foil, etc.) was coated with a bi-component polyurethane adhesive (a polyurethane-modified polyester polyol or a polyester polyol and an aromatic isocyanate-based compound) mixed in different NCO/OH ratios (herein, "NCO/OH ratios" refers to NCO/OH equivalent ratios), and the adhesive layer 2 (3 μm) was formed on the intermediate metal foil. After the outer-layer adhesive layer 2 on the intermediate metal foil was thermally compounded with the outer substrate resin layer 1 film, they were cured at a temperature of 80° C. for 3 days to form the outer substrate resin layer/outer-layer adhesive layer (3 μm)/intermediate metal layer. Both sides of the intermediate metal layer 5 were subjected to anti-corrosion treatment in advance.

Three methods were used to form the outer-layer adhesive layer 2 on one side of the intermediate metal foil, and they are:

A-1: An amorphous polyester polyol having a weight-average molecular weight of 80,000, a Tg of 79° C. and a hydroxyl value of 16 mg KOH/g and an amorphous polyester polyol having a weight-average molecular weight of 6500, a Tg of −3° C. and a hydroxyl value of 10 mg KOH/g were mixed in a weight ratio of 10:5, and toluene diisocyanate (TDI) was added to form a mixed outer-layer adhesive solution with a NCO/OH ratio of 21.0;

A-2: An amorphous polyester polyol having a weight-average molecular weight of 5000, a Tg of 50° C. and a hydroxyl value of 25 mg KOH/g and an amorphous polyester polyol having a weight-average molecular weight of 20,000, a Tg of −17° C. and a hydroxyl value of 8 mg KOH/g were mixed in a weight ratio of 3:2, and toluene diisocyanate (TDI) was added to form a mixed outer-layer adhesive solution with a NCO/OH ratio of 6.2;

A-3: An amorphous polyurethane-modified polyester polyol having a weight-average molecular weight of 40,000, a Tg of −3° C. and a hydroxyl value of 3 mg KOH/g, an amorphous polyester polyol having a weight-average molecular weight of 15,000, a Tg of −10° C. and a hydroxyl value of 15 mg KOH/g and an amorphous polyester polyol having a weight-average molecular weight of 3000, a Tg of 60° C. and a hydroxyl value of 50 mg KOH/g were mixed in a weight ratio of 10:10:0.1, and toluene diisocyanate (TDI) was added to form a mixed outer-layer adhesive solution with a NCO/OH ratio of 4.

Examples 1, 5, 6, 7, 9, 10 and 15 and Comparative Examples 1-6 used the outer-layer adhesive A-1 method. Examples 2, 3, 11 and 12 used the outer-layer adhesive layer A-2 method. Examples 4, 8, 13 and 14 used the outer-layer adhesive A-3 method.

Both sides of the intermediate metal layer 5 were subjected to anti-corrosion treatment in advance to form anti-corrosion layers 6 and 4.

The anti-corrosion agents of Examples 1-5 and 7-8 and Comparative Example 2 are all aqueous solutions consisting of a trivalent chromium compound—chromium fluoride, an organic solvent-2-butoxyethanol, an inorganic acid—hydrofluoric acid, an organic resin—polyvinyl alcohol resin, a titanate—fluorotitanic acid; the formulas for the anti-corrosion agents of Example 6 and Comparative Example 3 do not include a titanate, and the other component choices are the same as those in Examples 1-5 and 7-8 and Comparative Example 2.

The anti-corrosion agents used in Examples 9, 10, 13 and 14 and Comparative Examples 4 and 5 are all aqueous solutions consisting of a trivalent chromium compound—chromium nitrate, inorganic acids—phosphoric acid and nitric acid, and organic resins—polyvinyl alcohol resin and polyacrylic acid resin; the anti-corrosion agent used in Example 11 is an aqueous solution consisting of a trivalent chromium compound—chromium phosphate, an inorganic acid—nitric acid, and an organic resin—polyacrylic acid resin; the anti-corrosion agent used in Example 12 is an aqueous solution consisting of a trivalent chromium compound—chromium nitrate, an inorganic acid—phosphoric acid, and an organic resin—polyacrylic acid resin.

In Examples 1-8 and Comparative examples 2-3, the aqueous solution consisting of a trivalent chromium compound, an inorganic acid, an organic resin, an organic solvent and a titanate (present or absent) was uniformly applied to both sides of a metal foil using a coating roll according to a certain proportion, and the metal foil was then baked at 190° C. for 2 min.

In Comparative Example 1, an aqueous solution consisting of a trivalent chromium compound—chromium phosphate, an inorganic acid—phosphoric acid, a fluoride and an aminated phenol polymer was uniformly applied to both sides of a metal foil using a coating roll according to a certain proportion, and the metal foil was then baked at 190° C. for 2 min.

Examples 9-14 and Comparative Examples 5 and 6 were uniformly applied to both sides of a metal foil using a coating roll according to a certain proportion, and the metal foil was then baked at 190° C. for 2 min. The coating wet film amount of the anti-corrosion layer treatment solution was 5 $g/m^2$.

In Example 15, a certain proportion of a fluoride—chromium fluoride—was added to the anti-corrosion agent of Example 12, the anti-corrosion agent was uniformly applied to both sides of a metal foil using a coating roll according to a certain proportion, and the metal foil was then baked at 190° C. for 2 min.

In Comparative Example 4, an aqueous solution consisting of a trivalent chromium compound—chromium phosphate, an inorganic acid—phosphoric acid, a fluoride and an aminated phenol polymer was uniformly applied to both sides of a metal foil using a coating roll according to a certain proportion, and the metal foil was then baked at 190° C. for 2 min.

Finally, the metal surface of the semi-finished product, outer substrate resin layer/outer-layer adhesive layer (3 μm)/intermediate metal layer, was compounded with the inner-layer adhesive layer 7 and the heat-fusible resin layer 8; there are 6 methods for this:

(1) Solution-type inner-layer adhesive layer B-1-*a* compounding method: A solution of an anhydrous maleic anhydride-modified polypropylene having a weight-average molecular weight of 80,000, a melting point of 80° C. and an acid value of 2 mg KOH/g and an aromatic isocyanate (PDI, dimethylisocyanate) solution were mixed in a solid ratio (mass ratio) of 20:1 to form a solution-type mixture, and the mixture was applied to a surface of the intermediate metal of the composite film having been compounded with the outer substrate resin layer 1, the surface having been subjected to anti-corrosion treatment and being in contact with the heat-fusible resin layer 8. After drying, a 4 μm thick adhesive layer B-1 was formed. Then the adhesive layer B-1 was thermally compounded with the adhesive surface of a 25 μm heat-fusible resin at a temperature of 80° C., and then they were cured at a temperature of 60° C. for 7 days to form a finished composite product of outer substrate resin layer/outer-layer adhesive layer (3 μm)/intermediate metal layer/inner-layer adhesive layer/heat-fusible resin layer (25 μm). The adhesive surface of the triple-layer heat-fusible resin layer in contact with the inner-layer adhesive layer 7 was subjected to corona treatment in advance.

The triple-layer structure of the heat-fusible resin comprises:

a resin layer in contact with the inner-layer adhesive layer 7: a layer consisting of random copolymer polypropylene having a melting point of 145° C. and an MFR (230° C.) of 7.5 g/10 min;

an intermediate resin layer: a mixture layer formed of 40 wt % block copolymer polypropylene having a melting point of 162° C. and an MFR (230° C.) of 2 g/10 min, 40 wt % block copolymer polypropylene having a melting point of 160° C. and an MFR (230° C.) of 5 g/10 min, and 20 wt % crystalline polymer elastomer consisting of ethylene-propylene having a melting point of 130° C., an MFR (230° C.) of 9.5 g/10 min and a density of 0.91 g/cm$^3$; and an innermost resin layer: a layer consisting of random copolymer polypropylene having a melting point of 145° C. and an MFR (230° C.) of 7.5 g/10 min.

In the heat-fusible resin layer 8, the thickness ratio of the three resin layers (from the layer in contact with the inner-layer adhesive layer 7 to the innermost layer) was 1:8:1.

(2) Solution-type inner-layer adhesive layer B-1-*b* compounding method: A solution of an anhydrous maleic anhydride-modified polypropylene having a weight-average molecular weight of 60,000, a melting point of 75° C. and an acid value of 5 mg KOH/g and an epoxy resin (bisphenol F diglycidyl ether) solution were mixed in a solid ratio (mass ratio) of 10:1 to form a solution-type mixture, and the mixture was applied to a surface of the intermediate metal layer 5 of the composite film having been compounded with the outer substrate resin, the surface having been subjected to anti-corrosion treatment and being in contact with the heat-fusible resin layer 8. After drying, a 2 μm thick adhesive layer B-1 was formed. Then the adhesive layer B-1 was thermally compounded with the adhesive surface of an 80 μm heat-fusible resin at a temperature of 80° C., and then they were cured at a temperature of 80° C. for 7 days to form a finished composite product of outer substrate resin layer/outer-layer adhesive layer (3 μm)/intermediate metal layer/inner-layer adhesive layer/heat-fusible resin layer (80 μm). The adhesive surface of the triple-layer heat-fusible resin layer 8 in contact with the inner-layer adhesive layer 7 was subjected to corona treatment in advance.

The heat-fusible resin consisted of three layers, and they are:

a resin layer in contact with the inner-layer adhesive layer 7: a layer consisting of random copolymer polypropylene having a melting point of 162° C. and an MFR (230° C.) of 5.5 g/10 min;

an intermediate resin layer: a mixture layer formed of 50 wt % block copolymer polypropylene having a melting point of 162° C. and an MFR (230° C.) of 2 g/10 min, 20 wt % random copolymer polypropylene having a melting point of 155° C. and an MFR (230° C.) of 5 g/10 min, 20 wt % polymer elastomer consisting of propylene-butene having a melting point of 160° C., an MFR (230° C.) of 9.5 g/10 min and a density of 0.87 g/cm$^3$, and 10 wt % amorphous propylene-based elastomer having an MFR (230° C.) of 3 g/10 min; and an innermost resin layer: a layer consisting of random copolymer polypropylene having a melting point of 145° C. and an MFR (230° C.) of 12 g/10 min.

In the heat-fusible resin layer 8, the thickness ratio of the three resin layers (from the layer in contact with the inner-layer adhesive layer 7 to the innermost layer) was 3:6:1.

(3) Hot-melt inner-layer adhesive layer B-2-*a* compounding method: The hot-melt resin used for the inner-layer adhesive layer 7 was anhydrous maleic anhydride-modified polypropylene. On the anti-corrosion treated surface of the intermediate metal layer 5 in contact with the heat-fusible resin layer 8 was formed a 15 μm thick adhesive layer. Further, the adhesive layer was compounded with a 30 μm thick heat-fusible resin. The inner-layer adhesive layer 7 and the heat-fusible resin layer 8 were compounded onto the anti-corrosion treatment surface of the intermediate metal layer 5 in contact with the heat-fusible resin layer 8 by melt co-extrusion. The inner-layer adhesive layer 7 used was a mixture consisting of 60 wt % anhydrous maleic anhydride-modified random copolymer polypropylene (the degree of modification of the random copolymer polypropylene by anhydrous maleic anhydride was 10%) having a melting point of 140° C. and an MFR (230° C.) of 5 g/10 min, 24 wt % copolymer elastomer of propylene and butene having a melting point of 160° C., an MFR (230° C.) of 2.6 g/10 min and a density of 0.87 g/cm$^3$, 8 wt % crystalline copolymer elastomer of ethylene and propylene having a melting point of 130° C., an MFR (230° C.) of 9.5 g/10 min and a density of 0.91 g/cm$^3$, and 8 wt % low-density polyethylene having a melting point of 105° C. and an MFR (230° C.) of 12 g/10 min.

The heat-fusible resin layer 8 consisted of two layers, and they are:

a resin layer in contact with the inner-layer adhesive layer 7: a mixture layer formed of 62 wt % random copolymer polypropylene having a melting point of 155° C. and an MFR (230° C.) of 4 g/10 min, 33 wt % amorphous propylene-based elastomer, and 5 wt % low-density polyethylene having a melting point of 110° C. and an MFR (230° C.) of 7.5 g/10 min; and an innermost resin layer: a layer consisting of random copolymer polypropylene having a melting point of 155° C. and an MFR (230° C.) of 15 g/10 min.

The thickness ratio of the resin layer in contact with the inner-layer adhesive layer 7 to the innermost resin layer was 8:2.

After the intermediate metal layer 5 was compounded with the inner-layer adhesive layer 7 and the heat-fusible resin layer 8, they were treated by heat at a temperature of 180° C. for 2 s. In this way, a finished composite product of outer substrate resin layer/outer-layer adhesive layer (3 μm)/intermediate metal layer/inner-layer adhesive layer (15 μm)/inner heat-fusible resin layer (30 μm) was formed.

(4) Hot-melt inner-layer adhesive layer B-2-*b* compounding method: The hot-melt resin used for the inner-layer adhesive layer 7 was methacrylic acid-modified polypropylene. A 30 μm thick inner-layer adhesive layer 7 was formed on the anti-corrosion treated surface of the intermediate metal layer 5 in contact with the heat-fusible resin layer 8 and was compounded with a 50 μm thick heat-fusible resin layer 8. The inner-layer adhesive layer 7 and the heat-fusible resin layer 8 were compounded onto the anti-corrosion treatment surface of the intermediate metal layer in contact with the heat-fusible resin layer 8 by melt co-extrusion. The inner-layer adhesive layer 7 used was a mixture consisting of 57 wt % methacrylic acid-modified random copolymer polypropylene (the degree of modification of the random copolymer polypropylene by methacrylic acid was 10%) having a melting point of 155° C. and an MFR (230° C.) of 2.5 g/10 min, 33 wt % amorphous propylene-based copolymer elastomer having an MFR (230° C.) of 3 g/10 min, and 10 wt % low-density polyethylene having a melting point of 105° C. and an MFR (230° C.) of 15 g/10 min.

The inner heat-fusible resin consisted of two layers, and they are:

a resin layer in contact with the inner-layer adhesive layer 7: a mixture layer formed of 60 wt % random copolymer polypropylene having a melting point of 152° C. and an MFR (230° C.) of 3 g/10 min, 15 wt % copolymer elastomer of propylene and butene having a melting point of 160° C., an MFR (230° C.) of 2.6 g/10 min and a density of 0.9 g/cm$^3$, 17 wt % crystalline copolymer elastomer of ethylene and propylene having a melting point of 130° C., an MFR (230° C.) of 9.5 g/10 min and a density of 0.91 g/cm$^3$, and 8 wt % low-density polyethylene having a melting point of 110° C. and an MFR (230° C.) of 7.5 g/10 min; and an innermost resin layer: a mixture layer consisting of 30% random copolymer polypropylene having a melting point of 138° C. and an MFR (230° C.) of 15 g/10 min, 30% random copolymer polypropylene having a melting point of 146° C. and an MFR (230° C.) of 7 g/10 min, 30% copolymer elastomer of propylene and butene having a melting point of 160° C., an MFR (230° C.) of 2.6 g/10 min and a density of 0.86 g/cm$^3$, and 10% low-density polyethylene having a melting point of 105° C. and an MFR (230° C.) of 12 g/10 min.

The thickness ratio of the resin layer in contact with the inner-layer adhesive layer 7 to the innermost resin layer was 8:2.

After the intermediate metal layer 5 was compounded with the inner-layer adhesive layer 7 and the heat-fusible resin layer 8, they were treated by heat at a temperature of 180° C. for 10 s. In this way, a finished composite product of outer substrate resin layer/outer-layer adhesive layer (3 μm)/intermediate metal layer/inner-layer adhesive layer (30 μm)/heat-fusible resin layer (50 μm) was formed.

(5) Solution-type inner-layer adhesive layer B-3-*a* compounding method: A solution-type inner-layer adhesive was used for the inner-layer adhesive layer 7. An inner-layer adhesive mixture of an anhydrous maleic anhydride-modified polypropylene resin having a weight-average molecular weight of 100,000, a melting point of 135° C. and an acid value of 2 mg KOH/g and epoxy resin was uniformly applied to a surface of the intermediate metal layer 5 of the composite film having been compounded with the outer substrate resin layer 1, the surface being in contact with the heat-fusible resin layer 8 and having been subjected to anti-corrosion treatment. After drying at a temperature of 150° C. for 2 min, a 2 μm thick adhesive layer B-3-*a* was formed. A 40 μm triple-layer heat-fusible resin film was compounded onto the inner-layer adhesive layer 7 by melt extrusion, and then they were treated by heat at a temperature of 160° C. for 30 s. In this way, a finished composite product of outer substrate resin layer/outer-layer adhesive layer (3 μm)/intermediate metal layer/inner-layer adhesive layer (2 μm)/heat-fusible resin layer (40 μm) was formed.

The triple-layer structure of the heat-fusible resin comprises:

a resin layer in contact with the inner-layer adhesive layer 7: a layer consisting of a mixture of 65 wt % maleic anhydride-modified random copolymer polypropylene having a melting point of 140° C. and an MFR (230° C.) of 5 g/10 min (the degree of acid modification was 10%) and 35 wt % amorphous propylene-based elastomer having an MFR (230° C.) of 3 g/10 min;

an intermediate resin layer: a mixture layer formed of 55 wt % polypropylene having a melting point of 160° C. and an MFR (230° C.) of 3.5 g/10 min, 40 wt % block copolymer polypropylene having a melting point of 130° C., an MFR (230° C.) of 9.5 g/10 min and a density of 0.91 g/cm$^3$, 20 wt % crystalline polymer elastomer consisting of ethylene-propylene having a melting point of 130° C., an MFR (230° C.) of 9.5 g/10 min and a density of 0.91 g/cm$^3$, and 10 wt % low-density polyethylene having a melting point of 105° C. and an MFR (230° C.) of 12 g/10 min; and an innermost resin layer: a layer consisting of random copolymer polypropylene having a melting point of 145° C. and an MFR (230° C.) of 7.5 g/10 min.

In the heat-fusible resin layer 8, the thickness ratio of the three resin layers (from the layer in contact with the inner-layer adhesive layer 7 to the innermost layer) was 1:8:1.

(6) Solution-type inner-layer adhesive B-3-*b* compounding method: A solution-type inner-layer adhesive was used for the inner-layer adhesive layer 7. An anhydrous maleic anhydride-modified polypropylene resin having a weight-average molecular weight of 70,000, a melting point of 145° C. and an acid value of 4.5 mg KOH/g and an amine compound such as triethylamine, N,N- dimethylethanolamine as a curing agent were uniformly applied to a surface of the intermediate metal of the composite film having been compounded with the outer substrate resin layer 1, the surface being in contact with the heat-fusible resin layer 8 and having been subjected to anti-corrosion treatment. After drying at a temperature of 160° C. for 2 min, a 4 μm thick adhesive layer B-3-*b* was formed. An 80 μm melt-extruded triple-layer heat-fusible resin film was thermally bonded under pressure to the inner-layer adhesive layer 7 at a temperature of 100° C., and then they were treated by heat at a temperature of 180° C. for 5 s. In this way, a finished composite product of outer substrate resin layer/outer-layer adhesive layer (3 μm)/intermediate metal layer/inner-layer adhesive layer (4 μm)/heat-fusible resin layer (80 μm) was formed.

The triple-layer structure of the heat-fusible resin layer 8 comprises:

a resin layer in contact with the inner-layer adhesive layer 7: a layer consisting of random copolymer polypropylene having a melting point of 145° C. and an MFR (230° C.) of 7.5 g/10 min;

an intermediate resin layer: a mixture layer formed of 35 wt % polypropylene having a melting point of 162° C. and an MFR (230° C.) of 3 g/10 min, 30 wt % polypropylene having a melting point of 160° C. and an MFR (230° C.) of 5 g/10 min, 15 wt % crystalline polymer elastomer consisting of ethylene-propylene having a melting point of 130° C., an MFR (230° C.) of 9.5 g/10 min and a density of 0.91 g/cm$^3$, and 20 wt % amorphous propylene-based elastomer having an MFR (230° C.) of 3 g/10 min; and an innermost resin layer: a layer consisting of random copolymer polypropylene having a melting point of 145° C. and an MFR (230° C.) of 7.5 g/10 min.

In the heat-fusible resin layer 8, the thickness ratio of the three resin layers (from the layer in contact with the inner-layer adhesive layer 7 to the innermost layer) was 1:8:1.

Example 1

The metal foil used was an 8079-series annealed aluminum foil having a thickness of 30 μm and a surface wettability of 70 dyn/cm. Both sides of the aluminum foil were subjected to anti-corrosion treatment. The components of the anti-corrosion solution capable of forming the anti-corrosion layers 6 on both sides of the aluminum foil and their amounts are described in Table 1: it contained 25 parts by mass of a trivalent chromium compound, 5 parts by mass of an inorganic acid, 10 parts by mass of an organic resin, and 5 parts by mass of a titanate. The trivalent chromium compound was chromium fluoride, the inorganic acid was hydrofluoric acid, the organic resin was polyvinyl alcohol resin, and the titanate was fluorotitanic acid. The chromium content of the anti-corrosion layer was 20 mg/m$^2$.

The outer substrate resin layer 1 was formed of a 30 μm thick asynchronously biaxially stretched nylon film. The inner-layer adhesive layer 7 was compounded with the heat-fusible resin layer 8 using the B-1-*a* method.

Example 2

The metal foil used was an 8021-series annealed aluminum foil having a thickness of 40 μm and a water contact angle of 10°. Both sides of the aluminum foil were subjected to anti-corrosion treatment. The components of the anti-corrosion solution capable of forming the anti-corrosion layers 6 on both sides of the aluminum foil and their amounts are described in Table 1: it contained 35 parts by mass of a trivalent chromium compound, 5 parts by mass of an inorganic acid, 10 parts by mass of an organic resin, and 5 parts by mass of a titanate. The trivalent chromium compound was chromium fluoride, the inorganic acid was hydrofluoric acid, the organic resin was polyvinyl alcohol resin, and the titanate was fluorotitanic acid. The chromium content of the anti-corrosion layer was 10 mg/m$^2$.

The outer substrate resin layer 1 was formed of a 25 μm thick asynchronously biaxially stretched polyethylene terephthalate (PET) film. The inner-layer adhesive layer 7 was compounded with the heat-fusible resin layer 8 using the B-2-*a* method.

Example 3

The metal foil used was an 8021-series annealed aluminum foil having a thickness of 35 μm and a water contact angle of 15°. Both sides of the aluminum foil were subjected to anti-corrosion treatment. The components of the anti-corrosion solution capable of forming the anti-corrosion layers 6 on both sides of the aluminum foil and their amounts are described in Table 1: it contained 25 parts by mass of a trivalent chromium compound, 3 parts by mass of an inorganic acid, 10 parts by mass of an organic resin, and 3 parts by mass of a titanate. The trivalent chromium compound was chromium fluoride, the inorganic acid was hydrofluoric acid, the organic resin was polyvinyl alcohol resin, and the titanate was fluorotitanic acid. The chromium content of the anti-corrosion layer was 25 mg/m$^2$.

The outer substrate resin layer 1 was formed of an asynchronously biaxially stretched nylon film having a total thickness of 15 μm. The inner-layer adhesive layer 7 was compounded with the heat-fusible resin layer 8 using the B-3-*a* method.

Example 4

The metal foil used was an annealed nickel-plated iron foil having a thickness of 50 μm and a surface wettability of 68 dyn/cm. The iron foil was plated with 1 μm thick nickel. Both sides of the iron foil were subjected to anti-corrosion treatment. The components of the anti-corrosion solution capable of forming the anti-corrosion layers 6 on both sides of the iron foil and their amounts are described in Table 1: it contained 30 parts by mass of a trivalent chromium compound, parts by mass of an inorganic acid, 10 parts by mass of an organic resin, and 1 part by mass of a titanate. The trivalent chromium compound was chromium fluoride, the inorganic acid was hydrofluoric acid, the organic resin was polyvinyl alcohol resin, and the titanate was fluorotitanic acid. The chromium content of the anti-corrosion layer was 15 mg/m$^2$.

The outer substrate resin layer 1 was formed of a 25 μm thick asynchronously biaxially stretched polybutylene terephthalate (PBT) film. The inner-layer adhesive layer 7 was compounded with the heat-fusible resin layer 8 using the B-3-*a* method.

Example 5

The metal foil used was a heat-treated austenitic stainless steel foil having a thickness of μm and a water contact angle of 10°. Both sides of the stainless steel foil were subjected to anti-corrosion treatment. The components of the anti-corrosion solution capable of forming the anti-corrosion layers 6 on both sides of the stainless steel foil and their amounts are described in Table 1: it contained 25 parts by mass of a trivalent chromium compound, 3 parts by mass of an inorganic acid, 11 parts by mass of an organic resin, and 3 parts by mass of a titanate. The trivalent chromium compound was chromium fluoride, the inorganic acid was hydrofluoric acid, the organic resin was polyvinyl alcohol resin, and the titanate was fluorotitanic acid. The chromium content of the anti-corrosion layer was 25 mg/m$^2$.

The outer substrate resin layer 1 is formed of a co-extrusion film of an asynchronously biaxially stretched polyethylene terephthalate film (12 μm), a polyurethane-based adhesive (2 μm) and an asynchronously biaxially stretched nylon film (15 μm) having a total thickness of 27 μm. The inner-layer adhesive layer 7 was compounded with the heat-fusible resin layer 8 using the B-2-*a* method.

Example 6

The metal foil used was an annealed 8021-series aluminum foil having a thickness of 80 μm and a water contact angle of 5°. Both sides of the aluminum foil were subjected to anti-corrosion treatment. The components of the anti-corrosion solution capable of forming the anti-corrosion layers 6 on both sides of the aluminum foil and their amounts are described in Table 1: it contained 30 parts by mass of a trivalent chromium compound, 1 part by mass of an inorganic acid, and 10 parts by mass of an organic resin. The trivalent chromium compound was chromium fluoride, the inorganic acid was hydrofluoric acid, and the organic resin was polyvinyl alcohol resin. The chromium content of the anti-corrosion layer was 35 mg/m$^2$.

The outer substrate resin layer 1 was formed of a 25 μm thick asynchronously biaxially stretched polyethylene terephthalate (PET) film. The inner-layer adhesive layer 7 was compounded with the heat-fusible resin layer 8 using the B-1-*b* method.

Example 7

The metal foil used was an annealed 8021-series aluminum foil having a thickness of 40 μm and a surface wettability of 72 dyn/cm. Both sides of the aluminum foil were subjected to anti-corrosion treatment. The components of the anti-corrosion solution capable of forming the anti-corrosion layers 6 on both sides of the aluminum foil and their amounts are described in Table 1: it contained 35 parts by mass of a trivalent chromium compound, 7 parts by mass of an inorganic acid, 11 parts by mass of an organic resin, and 1 part by mass of a titanate. The trivalent chromium compound was chromium fluoride, the inorganic acid was hydrofluoric acid, the organic resin was polyvinyl alcohol resin, and the titanate was fluorotitanic acid. The chromium content of the anti-corrosion layer was 20 mg/m$^2$.

The outer substrate resin layer 1 is formed of a composite film of an asynchronously biaxially stretched polyethylene terephthalate film (12 μm), a polyurethane-based adhesive (2 μm) and an asynchronously biaxially stretched nylon film (15 μm) having a total thickness of 27 μm. The nylon side of the composite film was in contact with the outer-layer adhesive layer 2. The inner-layer adhesive layer 7 was compounded with the heat-fusible resin layer 8 using the B-2-*b* method.

Example 8

The metal foil used was an annealed 8021-series aluminum foil having a thickness of 40 μm and a surface wettability of 68 dyn/cm. Both sides of the aluminum foil were subjected to anti-corrosion treatment. The components of the anti-corrosion solution capable of forming the anti-corrosion layers 6 on both sides of the aluminum foil and their amounts are described in Table 1: it contained 30 parts by mass of a trivalent chromium compound, 1 part by mass of an inorganic acid, 10 parts by mass of an organic resin, and 3 parts by mass of a titanate. The trivalent chromium compound was chromium fluoride, the inorganic acid was hydrofluoric acid, the organic resin was polyvinyl alcohol resin, and the titanate was fluorotitanic acid. The chromium content of the anti-corrosion layer was 42 mg/m$^2$.

The outer substrate resin layer 1 is formed of a co-extrusion film of an asynchronously biaxially stretched polyethylene terephthalate film (3 μm), a polyurethane-based adhesive (2 μm) and an asynchronously biaxially stretched nylon film (20 μm) having a total thickness of 25 μm. The nylon side of the composite film was in contact with the outer-layer adhesive layer 2. The inner-layer adhesive layer 7 was compounded with the heat-fusible resin layer 8 using the B-3-*b* method.

In comparison with Example 6, the intermediate metal anti-corrosion layer 6 of this example contained a titanate component, and it was found that the initial peel strength of the finished metal composite film and the peel strength after 3 days of standing in a water-free or water-containing electrolyte solution environment weakened relatively considerably, which indicates that the introduction of the titanate can further improve the degree of crosslinking and adhesion of the anti-corrosion film on the metal surface on the basis of Example 6, improving the corrosion resistance of the metal composite film.

Example 9

The metal foil used was an 8079-series annealed aluminum foil having a thickness of 30 μm and a surface wettability of 70 dyn/cm. Both sides of the aluminum foil were subjected to anti-corrosion treatment. The components of the anti-corrosion solution capable of forming the anti-corrosion layers 6 on both sides of the aluminum foil and their amounts are described in Table 2: it contained 20 parts by mass of a trivalent chromium compound, 10 parts by mass of inorganic acids, and 10 parts by mass of organic resins. The trivalent chromium compound was chromium nitrate, the inorganic acids were phosphoric acid and nitric acid, and the organic resins were polyvinyl alcohol and polyacrylic acid resins. The chromium content of the anti-corrosion layer was 20 mg/m$^2$.

The outer substrate resin layer 1 was formed of a 30 μm thick asynchronously biaxially stretched nylon film. The inner-layer adhesive layer 7 was compounded with the heat-fusible resin layer 8 using the B-2-*a* method.

Example 10

The metal foil used was an 8021-series annealed aluminum foil having a thickness of 40 μm and a water contact angle of 10°. Both sides of the aluminum foil were subjected to anti-corrosion treatment. The components of the anti-corrosion solution capable of forming the anti-corrosion layers 6 on both sides of the aluminum foil and their amounts are described in Table 2: it contained 20 parts by mass of a trivalent chromium compound, 20 parts by mass of inorganic acids, and 60 parts by mass of organic resins. The trivalent chromium compound was chromium nitrate, the inorganic acids were phosphoric acid and nitric acid, and the organic resins were polyvinyl alcohol and polyacrylic acid resins. The chromium content of the anti-corrosion layer was 10 mg/m$^2$.

The outer substrate resin layer 1 was formed of a 25 μm thick asynchronously biaxially stretched polyethylene terephthalate (PET) film. The inner-layer adhesive layer 7 was compounded with the heat-fusible resin layer 8 using the B-1-*a* method.

Example 11

The metal foil used was an 8021-series annealed aluminum foil having a thickness of 35 μm and a water contact angle of 15°. Both sides of the aluminum foil were subjected to anti-corrosion treatment. The components of the anti-corrosion solution capable of forming the anti-corrosion layers 6 on both sides of the aluminum foil and their amounts are described in Table 2: it contained 20 parts by mass of a trivalent chromium compound, 40 parts by mass of an inorganic acid, and 40 parts by mass of an organic resin. The trivalent chromium compound was chromium phosphate, the inorganic acid was nitric acid, and the organic resin was polyacrylic acid resin. The chromium content of the anti-corrosion layer was 30 mg/m$^2$.

The outer substrate resin layer 1 was formed of an asynchronously biaxially stretched nylon film having a total thickness of 15 μm. The inner-layer adhesive layer 7 was compounded with the heat-fusible resin layer 8 using the B-3-*a* method.

Example 12

The metal foil used was an annealed nickel-plated iron foil having a thickness of 50 μm and a surface wettability of 68 dyn/cm. The iron foil was plated with 1 μm thick nickel. Both sides of the iron foil were subjected to anti-corrosion treatment. The components of the anti-corrosion solution capable of forming the anti-corrosion layers 6 on both sides of the iron foil and their amounts are described in Table 2: it contained 50 parts by mass of a trivalent chromium compound, parts by mass of an inorganic acid, and 20 parts by mass of an organic resin. The trivalent chromium compound was chromium nitrate, the inorganic acid was phosphoric acid, and the organic resin was polyacrylic acid resin. The chromium content of the anti-corrosion layer was 15 mg/m$^2$.

The outer substrate resin layer 1 was formed of a 25 μm thick asynchronously biaxially stretched polybutylene terephthalate (PBT) film. The inner-layer adhesive layer 7 was compounded with the heat-fusible resin layer 8 using the B-1-*b* method.

Example 13

The metal foil used was a heat-treated austenitic stainless steel foil having a thickness of 30 μm and a water contact angle of 10°. Both sides of the stainless steel foil were subjected to anti-corrosion treatment. The components of the anti-corrosion solution capable of forming the anti-corrosion layers 6 on both sides of the stainless steel foil and their amounts are described in Table 2: it contained 60 parts by mass of a trivalent chromium compound, 12 parts by mass of inorganic acids, and 36 parts by mass of organic resins. The trivalent chromium compound was chromium nitrate, the inorganic acids were phosphoric acid and nitric acid, and the organic resins were polyvinyl alcohol and polyacrylic acid resins. The chromium content of the anti-corrosion layer was 25 mg/m$^2$.

The outer substrate resin layer 1 is formed of a co-extrusion film of an asynchronously biaxially stretched polyethylene terephthalate film (12 μm), a polyurethane-based adhesive (2 μm) and an asynchronously biaxially stretched nylon film (15 μm) having a total thickness of 27 μm. The inner-layer adhesive layer 7 was compounded with the heat-fusible resin layer 8 using the B-2-*b* method.

Example 14

The metal foil used was an annealed 8021-series aluminum foil having a thickness of 80 μm and a water contact angle of 5°. Both sides of the aluminum foil were subjected to anti-corrosion treatment. The components of the anti-corrosion solution capable of forming the anti-corrosion layers 6 on both sides of the aluminum foil and their amounts are described in Table 2: it contained 36 parts by mass of a trivalent chromium compound, 6 parts by mass of inorganic acids, and 6 parts by mass of organic resins. The trivalent chromium compound was chromium nitrate, the inorganic acids were phosphoric acid and nitric acid, and the organic resins were polyvinyl alcohol and polyacrylic acid resins. The chromium content of the anti-corrosion layer was 35 mg/m$^2$.

The outer substrate resin layer 1 was formed of a 25 μm thick asynchronously biaxially stretched polyethylene terephthalate (PET) film. The inner-layer adhesive layer 7 was compounded with the heat-fusible resin layer 8 using the B-3-*b* method.

Example 15

The metal foil used was an annealed 8021-series aluminum foil having a thickness of 40 μm and a surface wettability of 72 dyn/cm. Both sides of the aluminum foil were subjected to anti-corrosion treatment. The components of the anti-corrosion solution capable of forming the anti-corrosion layers 6 on both sides of the aluminum foil and their amounts are described in Table 2: it contained 20 parts by mass of a trivalent chromium compound, 20 parts by mass of inorganic acids, 10 parts by mass of a fluoride, and 60 parts by mass of organic resins. The trivalent chromium compound was chromium nitrate, the fluoride was chromium fluoride, the inorganic acids were phosphoric acid and nitric acid, and the organic resins were polyvinyl alcohol and polyacrylic acid resins. The chromium content of the anti-corrosion layer was 20 mg/m$^2$.

The outer substrate resin layer 1 is formed of a composite film of an asynchronously biaxially stretched polyethylene terephthalate film (12 μm), a polyurethane-based adhesive (2 μm) and an asynchronously biaxially stretched nylon film (15 μm) having a total thickness of 27 μm. The nylon side of the composite film was in contact with the outer-layer adhesive layer 2. The inner-layer adhesive layer 7 was compounded with the heat-fusible resin layer 8 using the B-1-*a* method.

In comparison with Examples 9, 10 and 12, a certain amount of fluoride was added to the intermediate metal anti-corrosion layer in this example, and it was found that after the finished metal composite film was left to stand in water-free and water-containing electrolyte solution environments for 3 days, the peel strength between its aluminum foil and the heat-fusible resin layer 8 was high, which indicates that the introduction of the fluoride can further improve the corrosion resistance of the anti-corrosion film on the metal surface on the basis of Examples 9, 10 and 12.

Comparative Example 1

The metal foil used was an annealed 8021-series aluminum foil having a thickness of 40 μm and a water contact angle of 10°. Both sides of the aluminum foil were subjected to anti-corrosion treatment. The components of the anti-corrosion solution capable of forming the anti-corrosion layers 6 on both sides of the aluminum foil and their amounts are described in Table 1: it contained 30 parts by mass of chromium phosphate, 4 parts by mass of phosphoric acid, 4 parts by mass of a fluoride, and 6 parts by mass of an aminated phenol resin. The chromium content of the anti-corrosion layer was 15 mg/m$^2$.

The outer substrate resin layer 1 is formed of a composite film of an asynchronously biaxially stretched polyethylene terephthalate film (12 μm), a polyurethane-based adhesive (2 μm) and an asynchronously biaxially stretched nylon film (15 μm) having a total thickness of 27 μm. The nylon side of the composite film was in contact with the outer-layer adhesive layer 2. The inner-layer adhesive layer 7 was compounded with the heat-fusible resin layer 8 using the B-2-*a* method.

Comparison of Examples 1-8 shows that when the anti-corrosion solution capable of forming the intermediate metal anti-corrosion layer 6 contained certain proportions of a trivalent chromium compound, an inorganic acid, an organic resin and a titanate, the initial peel strength of the metal composite film obtained by compounding was 9 N/15 mm or higher, and that after 3 days of standing in a water-free electrolyte solution environment and a water-containing electrolyte solution environment, the maintenance rates of the peel strength reached 80% or higher, and 70% or higher, respectively. In Comparative Example 1, a common anti-corrosion solution available on the market was applied, and it was found that the initial peel strength of the finished metal composite film was 11.1 N/15 mm, and that after 3 days of standing in a water-free electrolyte solution environment and a water-containing electrolyte solution environment, the maintenance rates of the peel strength between the metal and the inner heat-fusible resin in the finished metal composite film were 80.2% and 61.3%, respectively. There is a relatively big difference in corrosion resistance between Comparative Example 1 and the metal composite films with anti-corrosion treatment of the present disclosure, which indicates that the anti-corrosion treated metal of the present disclosure can improve to some extent the adhesion between the metal and the inner heat-fusible resin in the metal composite film and the corrosion resistance in an electrolyte solution environment containing more water.

Comparative Example 2

The metal foil used was an annealed 8021-series aluminum foil having a thickness of 40 μm and a surface wettability of 70 dyn/cm. Both sides of the aluminum foil were subjected to anti-corrosion treatment. The components of the anti-corrosion solution capable of forming the anti-corrosion layers 6 on both sides of the aluminum foil and their amounts are described in Table 1: it contained 45 parts by mass of a trivalent chromium compound, 5 parts by mass of an inorganic acid, 10 parts by mass of an organic resin, and 1 part by mass of a titanate. The trivalent chromium compound was chromium fluoride, the inorganic acid was hydrofluoric acid, the organic resin was polyvinyl alcohol resin, and the titanate was fluorotitanic acid. The chromium content of the anti-corrosion layer was 20 mg/m$^2$.

The outer substrate resin layer 1 was formed of a 30 μm thick asynchronously biaxially stretched nylon film. The inner-layer adhesive layer 7 was compounded with the heat-fusible resin layer 8 using the B-2-*a* method.

In comparison with Examples 1-8, the metal surface in this comparative example contained the same anti-corrosion components, but the proportion of the trivalent chromium compound among the anti-corrosion components on the metal surface was beyond the range claimed by the present disclosure, and it was found that the maintenance rate of the peel strength between the metal and the inner heat-fusible resin in the finished metal composite film was reduced to 76.8% after 3 days of standing in a water-free electrolyte solution environment, and that the maintenance rate of the peel strength was reduced to 53.6% after 3 days of standing in a water-containing electrolyte solution environment. It is shown that the proportion of the trivalent chromium compound in the anti-corrosion layer on the metal surface of the examples of the present disclosure being within the range claimed by the present disclosure can improve the corrosion resistance of the metal composite film.

Comparative Example 3

The metal foil used was an annealed 8021-series aluminum foil having a thickness of 40 μm and a water contact angle of 10°. Both sides of the aluminum foil were subjected to anti-corrosion treatment. The components of the anti-corrosion solution capable of forming the anti-corrosion layers 6 on both sides of the aluminum foil and their amounts are described in Table 1: it contained 25 parts by mass of a trivalent chromium compound, 5 parts by mass of an inorganic acid, and 15 parts by mass of an organic resin. The trivalent chromium compound was chromium fluoride, the inorganic acid was hydrofluoric acid, and the organic resin was polyvinyl alcohol resin. The chromium content of the anti-corrosion layer was 20 mg/m$^2$.

The outer substrate resin layer 1 was formed of a 30 μm thick asynchronously biaxially stretched nylon film. The surface of the composite film bonded to the dark side of the aluminum foil required corona treatment. The inner-layer adhesive layer 7 was compounded with the heat-fusible resin layer 8 using the B-2-*a* method.

In comparison with Examples 1-8 and Comparative Example 2, the surface of the aluminum foil in this comparative example contained no titanate component, and the proportion of the organic resin among the anti-corrosion components on the metal surface was beyond the range claimed by the present disclosure, and it was found that the maintenance rate of the peel strength between the metal and the inner heat-fusible resin in the finished metal composite film was reduced to 65.5% after 3 days of standing in a water-free electrolyte solution environment, and that the maintenance rate of the peel strength was reduced to 36.4% after 3 days of standing in a water-containing electrolyte solution environment. It is shown that the organic resin content of the anti-corrosion layer on the metal surface of the present disclosure being within the range claimed by the present disclosure can also improve the corrosion resistance of the metal composite film.

Comparative Example 4

The metal foil used was an annealed 8021-series aluminum foil having a thickness of 40 μm and a water contact angle of 10°. Both sides of the aluminum foil were subjected to anti-corrosion treatment. The components of the anti-corrosion solution capable of forming the anti-corrosion layers 6 on both sides of the aluminum foil and their amounts are described in Table 2: it contained 30 parts by mass of a trivalent chromium compound, 4 parts by mass of an inorganic acid, 4 parts by mass of a fluoride, and 6 parts by mass of an organic resin. The trivalent chromium compound was chromium phosphate, the inorganic acid was phosphoric acid, and the organic resin was an aminated phenol resin. The chromium content of the anti-corrosion layer was 15 mg/m$^2$.

The outer substrate resin layer 1 is formed of a composite film of an asynchronously biaxially stretched polyethylene terephthalate film (12 μm), a polyurethane-based adhesive (2 μm) and an asynchronously biaxially stretched nylon film (15 μm) having a total thickness of 27 μm. The nylon side of the composite film was in contact with the outer-layer adhesive layer 2. The inner-layer adhesive layer 7 was compounded with the heat-fusible resin layer 8 using the B-1-*a* method.

Comparison of Examples 9-15 shows that when the anti-corrosion solution capable of forming the intermediate metal anti-corrosion layer 6 contained certain proportions of a trivalent chromium compound, an inorganic acid, a fluoride and an organic resin, the maintenance rates of the peel strength after 3 days of standing in a water-free electrolyte solution environment and a water-containing electrolyte solution environment reached 82-95% and 71-80%, respectively. In Comparative Example 1, a common anti-corrosion solution available on the market was applied, and it was found that the initial peel strength of the finished metal composite film was only 11.1 N/15 mm, and that after 3 days of standing in a water-free electrolyte solution environment and a water-containing electrolyte solution environment, the maintenance rates of the peel strength were and 61.3%, respectively. There is a very big difference in corrosion resistance between Comparative Example 1 and the metal composite films with anti-corrosion treatment of the present disclosure, which indicates that the anti-corrosion treated metal of the present disclosure can improve to some extent the adhesion between the metal and the inner heat-fusible resin in the metal composite film and the corrosion resistance in water-free and water-containing electrolyte solution resistance environments.

Comparative Example 5

The metal foil used was an annealed 8021-series aluminum foil having a thickness of 40 μm and a surface wettability of 70 dyn/cm. Both sides of the aluminum foil were subjected to anti-corrosion treatment. The components of the anti-corrosion solution capable of forming the anti-corrosion layers 6 on both sides of the aluminum foil and their amounts are described in Table 2: it contained 66 parts by mass of a trivalent chromium compound, 6 parts by mass of inorganic acids, and 6 parts by mass of organic resins. The trivalent chromium compound was chromium nitrate, the inorganic acids were phosphoric acid and nitric acid, and the organic resins were polyvinyl alcohol and polyacrylic acid resins. The chromium content of the anti-corrosion layer was 20 mg/m$^2$.

The outer substrate resin layer 1 was formed of a 30 μm thick asynchronously biaxially stretched nylon film. The inner-layer adhesive layer 7 was compounded with the heat-fusible resin layer 8 using the B-2-*a* method.

In comparison with Examples 9-14, this comparative example contained the same trivalent chromium compound, inorganic acid and organic resin components, but the trivalent chromium compound content was larger, and it was found that the initial peel strength of the finished metal composite film slightly decreased, and that the maintenance rate of the peel strength was reduced to 75.2% after 3 days of standing in a water-free electrolyte solution environment and to 50.2% after 3 days of standing in a water-containing electrolyte solution environment. It is shown that the proportions of the components for anti-corrosion treatment of the metal surface of the present disclosure being within the given ranges of the present disclosure can effectively improve the corrosion resistance of the metal composite film relative to Comparative Example 5.

Comparative Example 6

The metal foil used was an annealed 8021-series aluminum foil having a thickness of 40 μm and a water contact angle of 10°. Both sides of the aluminum foil were subjected to anti-corrosion treatment. The components of the anti-corrosion solution capable of forming the anti-corrosion layers 6 on both sides of the aluminum foil and their amounts are described in Table 2: its surface contained 20 parts by mass of a trivalent chromium compound, 20 parts by mass of inorganic acids, and 80 parts by mass of organic resins. The trivalent chromium compound was chromium nitrate, the inorganic acids were phosphoric acid and nitric acid, and the organic resins were polyvinyl alcohol and polyacrylic acid resins. The chromium content of the anti-corrosion layer was 20 mg/m$^2$.

The outer substrate resin layer 1 was formed of a 30 μm thick asynchronously biaxially stretched nylon film. The surface of the composite film bonded to the dark side of the aluminum foil required corona treatment. The inner-layer adhesive layer 7 was compounded with the heat-fusible resin layer 8 using the B-2-*a* method.

In comparison with Examples 9-15 and Comparative Example 5, this comparative example contained the same trivalent chromium compound, inorganic acid and organic resin components, but the organic resin content was larger and was beyond the range claimed by the present disclosure, and it was found that the initial peel strength of the finished metal composite film was only 10.3 N/15 mm, and that the maintenance rate of the peel strength was reduced to 62.9% after 3 days of standing in a water-free electrolyte solution environment and to 31.5% after 3 days of standing in a water-containing electrolyte solution environment. It is shown that the proportions of the components for anti-corrosion treatment of the metal surface have a great effect on the corrosion resistance of the metal composite film. The components for anti-corrosion treatment of the metal surface of the present disclosure being within the ranges of the present disclosure can effectively improve the corrosion resistance of the metal composite film.

TABLE 1

Test results of one embodiment of the present disclosure

| Test item | | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|---|
| Main components and their amounts (in parts by mass) of anti-corrosion solution capable of forming anti-corrosion layer on intermediate metal | Trivalent chromium compound | 25 | 35 | 25 | 30 | 25 | 30 | 35 | 30 | 30 | 45 | 25 |
| | Inorganic acid | 5 | 5 | 3 | 5 | 3 | 1 | 7 | 1 | 4 | 5 | 5 |
| | Organic resin | 10 | 10 | 10 | 10 | 11 | 10 | 11 | 10 | / | 10 | 15 |
| | Titanate | 5 | 5 | 3 | 1 | 3 | / | 1 | 3 | / | 1 | / |
| | Fluoride | / | / | / | / | / | / | / | / | 4 | / | / |
| | Aminated phenol | / | / | / | / | / | / | / | / | 6 | / | / |
| Peel strength between metal//inner fusible layer (N/15 mm) | Initial | 9.0 | 11.6 | 15.2 | 16.1 | 10.4 | 19.5 | 11.4 | 20.1 | 11.1 | 11.2 | 11.0 |
| Water-free electrolyte solution resistance test: peel strength between metal//inner fusible layer (N/15 mm) | After 3 days of immersion | 7.5 | 10.4 | 14.5 | 14.9 | 9.2 | 16.2 | 10.1 | 19.3 | 8.9 | 8.6 | 7.2 |
| | Maintenance rate % | 83.3 | 89.7 | 95.4 | 92.6 | 88.5 | 83.1 | 88.6 | 96.0 | 80.2 | 76.8 | 65.5 |
| Water-containing electrolyte solution resistance test: peel strength between metal//inner fusible layer (N/15 mm) | After 3 days of immersion | 6.8 | 9.2 | 13.1 | 13.7 | 8.2 | 14.3 | 9.1 | 17.3 | 6.8 | 6.0 | 4.0 |
| | Maintenance rate | 75.6 | 79.3 | 86.2 | 85.1 | 78.9 | 73.3 | 79.8 | 86.1 | 61.3 | 53.6 | 36.4 |

Note: The maintenance rate refers to the ratio of the peel strength between metal//inner fusible layer measured after resistance to electrolyte solution to the initial strength

TABLE 2

Test results of one embodiment of the present disclosure

| Test item | | Example 9 | Example 10 | Example 11 | Example 12 | Example 13 | Example 14 | Example 15 | Comparative Example 4 | Comparative Example 5 | Comparative Example 6 |
|---|---|---|---|---|---|---|---|---|---|---|---|
| Main components and their amounts (in parts by mass) of anti-corrosion solution capable of forming anti-corrosion layer on intermediate metal | Trivalent chromium compound | 20 | 20 | 20 | 50 | 60 | 36 | 20 | 30 | 66 | 20 |
| | Inorganic acid | 10 | 20 | 40 | 20 | 12 | 6 | 20 | 4 | 6 | 20 |
| | Fluoride | / | / | / | / | / | / | 10 | 4 | / | / |
| | Organic resin | 10 | 60 | 40 | 20 | 36 | 6 | 60 | / | 6 | 80 |
| | Aminated phenol | / | / | / | / | / | / | | 6 | / | / |

TABLE 2-continued

Test results of one embodiment of the present disclosure

| Test item | | Example 9 | Example 10 | Example 11 | Example 12 | Example 13 | Example 14 | Example 15 | Comparative Example 4 | Comparative Example 5 | Comparative Example 6 |
|---|---|---|---|---|---|---|---|---|---|---|---|
| Peel strength between metal//inner fusible layer (N/15 mm) | Initial | 12.6 | 11.5 | 14.2 | 19.3 | 18.4 | 20.6 | 12.3 | 11.1 | 10.5 | 10.3 |
| Water-free electrolyte solution resistance test: peel strength between metal//inner fusible layer (N/15 mm) | After 3 days of immersion | 11.2 | 10.4 | 13.1 | 15.8 | 15.9 | 19.6 | 11.2 | 8.9 | 7.9 | 6.5 |
| | Maintenance rate % | 88.9 | 90.4 | 92.5 | 82.1 | 86.4 | 95.1 | 91.1 | 80.5 | 75.2 | 62.9 |
| Water-containing electrolyte solution resistance test: peel strength between metal//inner fusible layer (N/15 mm) | After 3 days of immersion | 9.8 | 8.9 | 11.8 | 13.8 | 14.3 | 16.5 | 9.6 | 6.8 | 5.3 | 3.2 |
| | Maintenance rate | 77.6 | 77.4 | 83.1 | 71.4 | 77.5 | 80.1 | 78.1 | 61.3 | 50.2 | 31.5 |

Note: The maintenance rate refers to the ratio of the peel strength between metal//inner fusible layer measured after resistance to electrolyte solution to the initial strength The above description is only for the purpose of illustrating some examples of the present disclosure and is not intended to limit the present disclosure. Any modification, equivalent substitution, improvement and the like made without departing from the spirit and principle of the present disclosure shall fall within the protection scope of the present disclosure. The technical scope of the present disclosure is not limited to the content of the specification, and must be determined according to the scope of the claims.

The invention claimed is:

1. A metal composite film comprising an outer substrate resin layer, an intermediate metal layer and a heat-fusible resin layer, wherein an anti-corrosion layer is formed on a side of the intermediate metal layer, the side being in contact with the heat-fusible resin layer;

the anti-corrosion layer is formed of an anti-corrosion solution by coating or heat treatment, the anti-corrosion solution comprising 2.5-3.8 wt % trivalent chromium compound, 0.1-0.8 wt % inorganic acid and 1-1.2 wt % organic resin;

the trivalent chromium compound is selected from chromium fluoride.

2. The metal composite film according to claim 1, wherein the anti-corrosion solution further comprises a titanate;

the anti-corrosion solution comprises 2.5-3.8 wt % trivalent chromium compound, 0.1-0.8 wt % inorganic acid, 1-1.2 wt % organic resin and 0-5 wt % titanate.

3. A metal composite film comprising an outer substrate resin layer, an intermediate metal layer and a heat-fusible resin layer, wherein an anti-corrosion layer is formed on a side of the intermediate metal layer, the side being in contact with the heat-fusible resin layer;

the anti-corrosion layer is formed of an anti-corrosion solution by coating or heat treatment, the anti-corrosion solution comprising 1.9-6 wt % trivalent chromium compound, 0.3-6 wt % inorganic acid and 0.6-6 wt % organic resin;

the trivalent chromium compound is selected from the group consisting of chromium nitrate, chromium phosphate and chromium chloride.

4. The metal composite film according to claim 3, wherein the anti-corrosion solution further comprises a fluoride;

the anti-corrosion solution comprises 1.9-6 wt % trivalent chromium compound, 0.3-6 wt % inorganic acid, 0-10 wt % fluoride and 0.6-6 wt % organic resin.

5. The metal composite film according to claim 1, wherein the metal composite film further comprises an inner-layer adhesive layer disposed between the anti-corrosion layer and the heat-fusible resin layer.

6. The metal composite film according to claim 5, wherein the metal composite film further comprises an outer-layer adhesive layer disposed between the outer substrate resin layer and the intermediate metal layer.

7. The metal composite film according to claim 1, wherein the metal composite film further comprises an outer-layer adhesive layer disposed between the outer substrate resin layer and the intermediate metal layer.

8. The metal composite film according to claim 6, wherein the metal composite film further comprises a colored layer disposed between the outer substrate resin layer and the outer-layer adhesive layer or formed by adding a pigment to the outer-layer adhesive layer.

9. The metal composite film according to claim 1, wherein the metal composite film further comprises a colored layer disposed on the outer side of the outer substrate resin layer.

10. The metal composite film according to claim 1, wherein an outer anti-corrosion layer is disposed on a side of the intermediate metal layer, the side being in contact with the outer-layer adhesive layer or the outer substrate resin layer.

11. The metal composite film according to claim 1, wherein the inorganic acid is selected from the group consisting of nitric acid and hydrofluoric acid.

12. The metal composite film according to claim 3, wherein the inorganic acid is selected from the group consisting of nitric acid and phosphoric acid.

13. The metal composite film according to claim 1, wherein the organic resin is polyvinyl alcohol.

14. The metal composite film according to claim 3, wherein the organic resin is made of a polyacrylic acid-based resin, or is made of a polyacrylic acid-based resin and polyvinyl alcohol.

15. The metal composite film according to claim 14, wherein the polyacrylic acid-based resin is selected from the group consisting of polyacrylic acid, polymethyl acrylate, a copolymer of acrylic acid and maleic acid, a copolymer of acrylic acid and styrene, and a sodium or ammonium salt derivative thereof;

the polyacrylic acid-based resin has a weight-average molecular weight of 10,000-800,000.

16. The metal composite film according to claim 1, wherein the anti-corrosion layer has a thickness of 1 nm to 3.0 μm.

17. The metal composite film according to claim 16, wherein the anti-corrosion layer has a thickness of 1 nm to 1.5 μm.

18. The metal composite film according to claim 1, wherein the anti-corrosion layer has a chromium content of 8-50 mg/m$^2$.

19. The metal composite film according to claim 18, wherein the anti-corrosion layer has a chromium content of 10-30 mg/m$^2$.

20. The metal composite film according to claim 1, wherein the anti-corrosion layer is formed of an anti-corrosion solution by coating or heat treatment.

21. The metal composite film according to claim 20, wherein the coating includes bar coating, roll coating, gravure coating or impregnation.

22. The metal composite film according to claim 2, wherein the titanate is selected from the group consisting of titanous sulfate, titanium oxysulfate, titanium ammonium sulfate, titanium nitrate, titanium ammonium nitrate, titanium sulfate, fluorotitanic acid and a complex thereof.

23. The metal composite film according to claim 4, wherein the fluoride is selected from the group consisting of chromium fluoride and aluminum fluoride.

24. The metal composite film according to claim 5, wherein the inner-layer adhesive layer is formed of a solution-type adhesive, whose components include an acid-modified polyolefin resin and a curing agent;

the inner-layer adhesive layer has a thickness of 1-10 μm.

25. The metal composite film according to claim 24, wherein the acid-modified polyolefin resin has a melting point of 60-155° C., a weight-average molecular weight of 10,000-150,000, and an acid value of 0.5-200 mg KOH/g.

26. The metal composite film according to claim 24, wherein the curing agent is selected from the group consisting of an isocyanate, an epoxy resin, an oxazoline, triethylamine and N,N-dimethylethanolamine;

an acid modifier used for the acid-modified polyolefin resin is selected from the group consisting of maleic anhydride, methacrylic acid, acrylic acid and itaconic anhydride.

27. The metal composite film according to claim 26, wherein when the curing agent is selected from one or more of triethylamine and N,N-dimethylethanolamine, the acid-modified polyolefin resin and the curing agent are in a mass ratio of 10:1 to 125:1.

28. The metal composite film according to claim 27, wherein the acid-modified polyolefin resin and the curing agent are in a mass ratio of 15:1 to 50:1.

29. The metal composite film according to claim 25, wherein the acid-modified polyolefin resin is selected from the group consisting of a block copolymer polypropylene resin, a random copolymer polypropylene resin and a homopolymer polypropylene resin having a melting point of above 110° C. and a polypropylene content of greater than 50%; the acid-modified polyolefin resin is in a single layer or multiple layers.

30. The metal composite film according to claim 5, wherein the inner-layer adhesive layer is formed of a hot-melt inner-layer adhesive, whose components include an acid-modified polyolefin resin;

the inner-layer adhesive layer has a thickness of 2-80 μm.

31. The metal composite film according to claim 30, wherein the acid-modified polyolefin resin has a melting point of 135-165° C. and an MFR (230° C.) of 3-15 g/10 min.

32. The metal composite film according to claim 30, wherein an acid modifier used for the acid-modified polyolefin resin is selected from the group consisting of maleic anhydride, methacrylic acid, acrylic acid and itaconic anhydride, and the polyolefin resin has a degree of modification of 1% to 15%.

33. The metal composite film according to claim 1, wherein the heat-fusible resin layer is selected from the group consisting of an acid-modified polyolefin resin, a homopolymer polypropylene resin, a block copolymer polypropylene resin, a random copolymer polypropylene resin, and a polyethylene resin; the heat-fusible resin layer is in a single layer or a composite layer.

34. The metal composite film according to claim 33, wherein a constituent resin of the heat-fusible resin layer has a melting point of 120-162° C. and an MFR (230° C.) of 2-15 g/10 min;

the heat-fusible resin layer has a thickness of 20-120 μm.

35. An electrochemical apparatus comprising the metal composite film according to claim 1.

* * * * *